US010931945B2

(12) United States Patent
Francois et al.

(10) Patent No.: US 10,931,945 B2
(45) Date of Patent: Feb. 23, 2021

(54) METHOD AND DEVICE FOR PROCESSING PREDICTION INFORMATION FOR ENCODING OR DECODING AN IMAGE

(71) Applicant: CANON KABUSHIKI KAISHA, Tokyo (JP)

(72) Inventors: Edouard Francois, Bourg des Comptes (FR); Patrice Onno, Rennes (FR); Christophe Gisquet, Rennes (FR); Guillaume Laroche, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 14/759,136

(22) PCT Filed: Jan. 2, 2014

(86) PCT No.: PCT/GB2014/050006
§ 371 (c)(1),
(2) Date: Jul. 2, 2015

(87) PCT Pub. No.: WO2014/106746
PCT Pub. Date: Jul. 10, 2014

(65) Prior Publication Data
US 2015/0341638 A1    Nov. 26, 2015

(30) Foreign Application Priority Data

Jan. 4, 2013  (GB) .................................. 1300101.1
Apr. 5, 2013  (GB) .................................. 1306199.9

(51) Int. Cl.
*H04N 19/11*    (2014.01)
*H04N 19/593*    (2014.01)
(Continued)

(52) U.S. Cl.
CPC ........... *H04N 19/11* (2014.11); *H04N 19/176* (2014.11); *H04N 19/187* (2014.11); *H04N 19/33* (2014.11);
(Continued)

(58) Field of Classification Search
CPC .... H04N 19/11; H04N 19/463; H04N 19/176; H04N 19/33; H04N 19/593; H04N 19/187
See application file for complete search history.

(56) References Cited

U.S. PATENT DOCUMENTS 9,363,511 B2 *  6/2016  Zhang .................... H04N 19/50
10,542,286 B2 *  1/2020  Yu .......................... H04N 19/33
(Continued)

FOREIGN PATENT DOCUMENTS

EP    1512115 A1    3/2005
EP    1715693 A2    10/2006
(Continued)

OTHER PUBLICATIONS

Zhang et al, "Intra Mode Coding in HEVC Standard".
(Continued)

*Primary Examiner* — Boubacar Abdou Tchoussou
(74) *Attorney, Agent, or Firm* — Canon U.S.A., Inc. IP Division

(57) ABSTRACT

A method of providing a mode value representing a prediction mode of at least part of an image to be encoded, the image being composed of a plurality of processing blocks, each processing block being predictable by applying a prediction mode of a plurality M of available prediction modes, the method comprising:
   determining first data indicative of a first set of n most probable prediction modes, from the plurality M of available prediction modes, for predicting the said at least part of an image;
(Continued)

determining, for the case where a most probable prediction mode is not used, second data representative of a second set of prediction modes of the plurality M of available prediction modes wherein the second set of prediction modes comprise a restricted number N of prediction modes of the M available prediction modes, the prediction modes of the second set being selected from the M available prediction modes according to a predefined condition.

65 Claims, 23 Drawing Sheets

(51) Int. Cl.
*H04N 19/176* (2014.01)
*H04N 19/463* (2014.01)
*H04N 19/187* (2014.01)
*H04N 19/33* (2014.01)

(52) U.S. Cl.
CPC ......... *H04N 19/463* (2014.11); *H04N 19/593* (2014.11)

(56) References Cited

U.S. PATENT DOCUMENTS

| | | | |
|---|---|---|---|
| 2006/0222070 A1 | 10/2006 | Park et al. | |
| 2013/0266064 A1* | 10/2013 | Zhang | H04N 19/50 375/240.12 |
| 2014/0003509 A1* | 1/2014 | Hong | H04N 19/197 375/240.12 |
| 2014/0037002 A1* | 2/2014 | Sato | H04N 19/176 375/240.12 |
| 2014/0064359 A1* | 3/2014 | Rapaka | H04N 19/00024 375/240.02 |
| 2014/0086323 A1* | 3/2014 | Chuang | H04N 19/159 375/240.12 |
| 2014/0169458 A1* | 6/2014 | Yu | H04N 19/59 375/240.12 |
| 2014/0241428 A1* | 8/2014 | Sato | H04N 13/0048 375/240.12 |
| 2015/0036743 A1* | 2/2015 | Lee | H04N 19/30 375/240.12 |
| 2015/0163512 A1* | 6/2015 | Cai | H04N 19/593 375/240.12 |
| 2015/0222912 A1* | 8/2015 | Chuang | H04N 19/463 375/240.12 |
| 2015/0304670 A1* | 10/2015 | Liu | H04N 19/96 375/240.13 |
| 2015/0341636 A1* | 11/2015 | Tsai | H04N 19/597 375/240.02 |

FOREIGN PATENT DOCUMENTS

| | | |
|---|---|---|
| EP | 1836857 A1 | 9/2007 |
| WO | 2009/080133 A1 | 7/2009 |
| WO | 2012/171463 A1 | 12/2012 |
| WO | 2013/003182 A1 | 1/2013 |

OTHER PUBLICATIONS

Seregin et al., "Description of Tool Experiment C5: Inter-layer syntax prediction using HEVC base layer", Joint Collaborative Team on Video Coding (JCT-VC) of ITU-T SG 16 WP 3 and ISO/IEC JTC 1/SC 29/WG 11 11th Meeting: Shanghai, CN, Oct. 10-19, 2012, Document: JCTVC-K1105, pp. 1-14.

Li et al., "Non-CE6: Simplification of intra chroma mode coding", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, Document: JCTVC-H0326, pp. 1-3.

Yeo et al., "Non-CE6: On intra prediction mode coding", Joint Collaborative Team on Video Coding (JCT-VC) of ITU-T SG16 WP3 and ISO/IEC JTC1/SC29/WG11 7th Meeting: Geneva, CH, Nov. 21-30, 2011, Document: JCTVC-G153, WG11 No. m21706, pp. 1-12.

Yeo et al., "CE6: Subtest 6c (6.2.1)—Intra mode coding simplification", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, Document: JCTVC-H0075, pp. 1-8.

Chen et al., "A proposal for Scalable HEVC Test Model", Joint Collaborative Team on Video Coding (JCT-VC) of ITU-T SG 16 WP 3 and ISO/IEC JTC 1/SC 29/WG 11 11th Meeting: Shanghai, CN, Oct. 10-19, 2012, Document: JCTVC-K0348, pp. 1-6.

Francois et al., "Non-TE5.1: simplification of remaining modes coding in SHVC", Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, pp. 1-3.

Francois et al., "Non-SCE1: simplification of intra mode coding in SHVC", Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, Document: JCTVC-M0115, pp. 1-6.

Francois et al., "Non-TE5.1: MPM derivation and coding in SHVC", Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, Document: JCTVC-L0105, pp. 1-4.

\* cited by examiner

METHOD AND DEVICE FOR PROCESSING PREDICTION INFORMATION FOR ENCODING OR DECODING AN IMAGE

CROSS-REFERENCE TO RELATED APPLICATIONS

The application is the National Phase application of PCT Application No. PCT/GB2014/050006, filed on Jan. 2, 2014 and titled "Method And Device For Processing Prediction Information For Encoding Or Decoding An Image". This application claims the benefit under 35 U.S.C. § 119(a)-(d) of United Kingdom Patent Application No. 1300101.1, filed on Jan. 4, 2013 and titled "Method And Device For Processing Prediction Information For Encoding Or Decoding An Image" and also of United Kingdom Patent Application No. 1306199.9 filed on Apr. 5, 2013 and titled "Method And Device For Processing Prediction Information For Encoding Or Decoding An Image". The above cited patent applications are incorporated herein by reference in their entirety.

The present invention concerns a method and device for processing prediction information for encoding or decoding at least part of an image.

The present invention further concerns a method and a device for encoding at least part of an image and a method and device for decoding at least part of an image. In embodiments of the invention the image is composed of blocks of pixels and is part of a digital video sequence.

Embodiments of the invention relate to the field of scalable video coding, in particular to scalable video coding applicable to the High Efficiency Video Coding (HEVC) standard.

BACKGROUND OF THE INVENTION

Video data is typically composed of a series of still images which are shown rapidly in succession as a video sequence to give the idea of a moving image. Video applications are continuously moving towards higher and higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended color gamut). This technological evolution puts higher pressure on the distribution networks that are already facing difficulties in bringing HDTV resolution and high data rates economically to the end user.

Video coding is a way of transforming a series of video images into a compact bitstream so that the capacities required for transmitting and storing the video images can be reduced. Video coding techniques typically use spatial and temporal redundancies of images in order to generate data bit streams of reduced size compared with the original video sequences. Spatial prediction techniques (also referred to as Intra coding) exploit the mutual correlation between neighbouring image pixels, while temporal prediction techniques (also referred to as INTER coding) exploit the correlation between images of sequential images. Such compression techniques render the transmission and/or storage of the video sequences more effective since they reduce the capacity required of a transfer network, or storage device, to transmit or store the bit-stream code.

An original video sequence to be encoded or decoded generally comprises a succession of digital images which may be represented by one or more matrices the coefficients of which represent pixels. An encoding device is used to code the video images, with an associated decoding device being available to reconstruct the bit stream for display and viewing.

Common standardized approaches have been adopted for the format and method of the coding process. One of the more recent standards is Scalable Video Coding (SVC) in which a video image is split into smaller sections (often referred to as macroblocks or blocks) and treated as being comprised of hierarchical layers. The hierarchical layers include a base layer, corresponding to lower quality images (or frames) of the original video sequence, and one or more enhancement layers (also known as refinement layers) providing better quality, images in terms of spatial and/or temporal enhancement compared to base layer images. SVC is a scalable extension of the H.264/AVC video compression standard. In SVC, compression efficiency can be obtained by exploiting the redundancy between the base layer and the enhancement layers.

A further video standard being standardized is HEVC, in which the macroblocks are replaced by so-referred to as Coding Units and are partitioned and adjusted according to the characteristics of the original image segment under consideration. This allows more detailed coding of areas of the video image which contain relatively more information and less coding effort for those areas with fewer features.

The video images may be processed by coding each smaller image portion individually, in a manner resembling the digital coding of still images or pictures. Different coding models provide prediction of an image portion in one frame, from a neighboring image portion of that frame, by association with a similar portion in a neighboring frame, or from a lower layer to an upper layer (referred to as "inter-layer prediction"). This allows use of already available coded information, thereby reducing the amount of coding bit-rate needed overall. In general, the more information that can be compressed at a given visual quality, the better the performance in terms of compression efficiency.

It is known that to ensure good scalable compression efficiency, it is advantageous to exploit redundancy that lies between the base layer and the enhancements layer, through so-referred to as inter-layer prediction techniques. However in some cases, the base layer data are not suitable for the enhancement layer because their quality is too low. It can also be desirable in some applications contexts to avoid using, partly or entirely, the base layer data.

The present invention has been devised to address one or more of the foregoing concerns.

A first aspect of the invention provides a method of providing a mode value representing a prediction mode of at least part of an image to be encoded, the image being composed of a plurality of processing blocks, each processing block being predictable by applying a prediction mode of a plurality M of available prediction modes, the method comprising:

determining first data indicative of a first set of (n) most probable prediction modes, from the plurality M of available prediction modes, for predicting the said at least part of an image;

determining, for the case where a most probable prediction mode is not used, second data representative of a second set of prediction modes of the plurality M of available prediction modes wherein the second set of prediction modes comprise a restricted number N of prediction modes of the M available prediction modes, the prediction modes of the second set being selected from the M available prediction modes according to a predefined condition.

More efficient coding can thus be provided since the second set of prediction modes defining remaining prediction modes is restricted in number. Consequently less bits are required to code remaining prediction modes. Complexity may also be reduced since fewer modes need to be tested at the encoder side, and at the decoder side, less prediction modes possibilities need to be considered.

In embodiments of the invention N<M−n

In an embodiment, $N=2^k$, with k being an integer value such that N<M. For example, $N=2^k$, and k<5. In one advantageous embodiment N=2 and in another N=4.

In an embodiment, there are three most probable prediction modes in the first set of most probable prediction modes (if n is the number of most probable prediction modes, n=3).

In an embodiment, the second set of remaining prediction modes excludes most probable prediction modes of the first set of prediction modes. Preferably, (M−n) possible modes are considered for inclusion in the set of N remaining prediction modes.

In an embodiment, prediction modes of the second set of remaining prediction modes are determined based on the most probable prediction modes.

In an embodiment, the image portion is part of an enhancement layer of image data and the prediction modes of the second set of prediction modes are determined based on prediction modes of at least one spatially corresponding processing block of a base layer of the image data.

In an embodiment, the prediction modes of the second set of prediction modes are determined based on prediction modes of at least one spatially corresponding processing block of the base layer of the image data in the case where the at least one spatially corresponding processing block is intra-coded.

In an embodiment, the prediction mode of at least one spatially corresponding processing block of the base layer of the image data is included in the second set of prediction modes in the case where the said prediction mode is different from the most probable prediction modes of the first set of prediction modes.

In an embodiment, the neighbouring angular prediction modes of the prediction mode of the at least one spatially corresponding processing block of the base layer is included in the second set of prediction modes in the case where the said prediction mode of the base layer is angular.

In an embodiment, in the case where the said prediction mode of the spatially corresponding processing block of the base layer is not angular, neighbouring angular modes of at least one angular prediction mode of the first set of prediction modes are included in the second set of prediction modes.

In an embodiment, in the case where the said prediction mode of the spatially corresponding processing block of the base layer is not angular and a first prediction mode of the first set of prediction modes is not angular, one or more prediction modes from a predefined set are added to the second set of prediction modes.

In an embodiment, in the case where the said prediction mode of the spatially corresponding processing block of the base layer is not intra coded, one or more prediction modes from a predefined set are added to the second set of prediction modes.

In an embodiment, the prediction mode of at least one spatially corresponding processing block of the base layer of the image data is included in the second set of prediction modes in the case where the said prediction mode is intra coded, angular and different from the most probable prediction modes of the first set of prediction modes.

In an embodiment, a reference prediction mode is made equal to the said prediction mode of at least one spatially corresponding processing block of the base layer in the case where the said prediction mode is intra coded and angular.

In an embodiment, neighbouring angular prediction modes of the reference prediction mode are included in the second set of prediction modes.

In an embodiment, the reference prediction mode is made equal to a prediction mode of the first set of prediction modes in the case where the said prediction mode of at least one spatially corresponding processing block of the base layer is not intra coded or not angular.

In an embodiment, in the case where the derived reference prediction mode is not angular, prediction modes from a predefined set of prediction modes are included in the second set of prediction modes.

In an embodiment, the prediction modes of the second set of prediction modes are determined based on prediction modes of at least one spatially corresponding processing block of the base layer of the image data if the at least one spatially corresponding processing block has an angular prediction mode.

In an embodiment, the prediction modes of the second set of prediction modes are determined based on prediction modes of at least one spatially corresponding processing block of the base layer of the image data in the case where at least one of the most probable prediction modes has an angular prediction mode. In an embodiment, the prediction modes of the second set of prediction modes are determined based on neighbouring angular modes of the angular mode of the at least one spatially corresponding processing block of the base layer of the image data.

In an embodiment, the prediction modes of the second set of prediction modes are determined based on neighbouring angular modes of the angular mode of at least one of the most probable prediction modes.

In an embodiment, a reference prediction mode is determined based on the most probable prediction modes and the prediction modes of at least one spatially corresponding processing block of a base layer of the image data wherein the prediction modes of the second set of prediction modes are determined based on neighbouring angular modes of the reference prediction mode.

In an embodiment, if the spatially corresponding processing block is not intra-coded the prediction mode of the spatially corresponding processing block is set to a predefined mode.

In an embodiment, the most probable prediction modes of the first set of prediction modes are determined based on prediction modes of processing blocks neighbouring the image portion to be encoded.

In an embodiment, the most probable prediction modes of the first set of prediction modes are determined based on prediction modes of at least one spatially corresponding processing block of the base layer.

In an embodiment, the most probable prediction modes are determined based on prediction modes of at least one spatially corresponding processing block of the base layer in the case where a at least one predefined criterion is satisfied, otherwise the most probable prediction modes are determined based on prediction modes of processing blocks neighbouring the image portion to be encoded.

In an embodiment, the at least one predefined criterion comprises whether or not the spatially corresponding processing block of the base layer is intra coded.

In an embodiment, the at least one predefined criterion comprises whether or not the spatially corresponding processing block of the base layer has an angular prediction mode.

In an embodiment, the most probable mode prediction modes are different from one another.

A further aspect of the invention provides a device for providing a mode value representing a prediction mode of at least part of an image to be encoded, the image being composed of a plurality of processing blocks, each processing block being predictable by applying a prediction mode of a plurality M of available prediction modes, the device comprising:

a processor for determining
        first data indicative of a first set of n most probable prediction modes, from the plurality M of available prediction modes, for predicting the said at least part of an image; and
        second data representative of a second set of prediction modes of the plurality M of available prediction modes wherein the second set of prediction modes comprise a restricted number N of prediction modes of the M available prediction modes, the prediction modes of the second set being selected from the M available prediction modes according to a predefined condition.

In embodiments of the invention N<M−n

In an embodiment, $N=2^k$, with k being an integer value such that N<M. In a particular embodiment $N=2^k$, and k<5. In one advantageous embodiment N=2 and in another N=4.

In an embodiment, there are three most probable prediction modes in the first set of most probable prediction modes.

In an embodiment, the second set of prediction modes excludes most probable prediction modes of the first set of prediction modes.

In an embodiment, prediction modes of the second set of prediction modes are determined based on the most probable prediction modes.

In an embodiment, the image portion is part of an enhancement layer of image data and the prediction modes of the second set of prediction modes are determined based on prediction modes of at least one spatially corresponding processing block of a base layer of the image data.

In an embodiment, the prediction modes of the second set of prediction modes are determined based on prediction modes of at least one spatially corresponding processing block of the base layer of the image data in the case where the at least one spatially corresponding processing block is intra-coded.

In an embodiment, the prediction mode of at least one spatially corresponding processing block of the base layer of the image data is included in the second set of prediction modes in the case where the said prediction mode is different from the most probable prediction modes of the first set of prediction modes.

In an embodiment, the neighbouring angular prediction modes of the prediction mode of the at least one spatially corresponding processing block of the base layer is included in the second set of prediction modes in the case where the said prediction mode of the base layer is angular.

In an embodiment, in the case where the said prediction mode of the spatially corresponding processing block of the base layer is not angular, neighbouring angular modes of at least one angular prediction mode of the first set of prediction modes are included in the second set of prediction modes.

In an embodiment, in the case where the said prediction mode of the spatially corresponding processing block of the base layer is not angular and a first prediction mode of the first set of prediction modes is not angular, one or more prediction modes from a predefined set are added to the second set of prediction modes.

In an embodiment, in the case where the said prediction mode of the spatially corresponding processing block of the base layer is not intra coded, one or more prediction modes from a predefined set are added to the second set of prediction modes.

In an embodiment, the prediction mode of at least one spatially corresponding processing block of the base layer of the image data is included in the second set of prediction modes in the case where the said prediction mode is intra coded, angular and different from the most probable prediction modes of the first set of prediction modes.

In an embodiment, a reference prediction mode is made equal to the said prediction mode of at least one spatially corresponding processing block of the base layer in the case where the said prediction mode is intra coded and angular.

In an embodiment, neighbouring angular prediction modes of the reference prediction mode are included in the second set of prediction modes.

In an embodiment, the reference prediction mode is made equal to a prediction mode of the first set of prediction modes in the case where the said prediction mode of at least one spatially corresponding processing block of the base layer is not intra coded or not angular.

In an embodiment, in the case where the derived reference prediction mode is not angular, prediction modes from a predefined set of prediction modes are included in the second set of prediction modes.

In an embodiment, the prediction modes of the second set of prediction modes are determined based on prediction modes of at least one spatially corresponding processing block of the base layer of the image data if the at least one spatially corresponding processing block has an angular prediction mode.

In an embodiment, the prediction modes of the second set of prediction modes are determined based on prediction modes of at least one spatially corresponding processing block of the base layer of the image data in the case where at least one of the most probable prediction modes has an angular prediction mode.

In an embodiment, the prediction modes of the second set of prediction modes are determined based on neighbouring angular modes of the angular mode of the at least one spatially corresponding processing block of the base layer of the image data.

In an embodiment, the prediction modes of the second set of prediction modes are determined based on neighbouring angular modes of the angular mode of at least one of the most probable prediction modes.

In an embodiment, a reference prediction mode is determined based on the most probable prediction modes and the prediction modes of at least one spatially corresponding processing block of a base layer of the image data wherein the prediction modes of the second set of prediction modes are determined based on neighbouring angular modes of the reference prediction mode.

In an embodiment, if the spatially corresponding processing block is not intra-coded the prediction mode of the spatially corresponding processing block is set to a predefined mode.

In an embodiment, the most probable prediction modes of the first set of prediction modes are determined based on prediction modes of processing blocks neighbouring the image portion to be encoded.

In an embodiment, the most probable prediction modes of the first set of prediction modes are determined based on prediction modes of at least one spatially corresponding processing block of the base layer.

In an embodiment, the most probable prediction modes are determined based on prediction modes of at least one spatially corresponding processing block of the base layer in the case where a at least one predefined criterion is satisfied, otherwise the most probable prediction modes are determined based on prediction modes of processing blocks neighbouring the image portion to be encoded.

In an embodiment, the at least one predefined criterion comprises whether or not the spatially corresponding processing block of the base layer is intra coded.

In an embodiment, the at least one predefined criterion comprises whether or not the spatially corresponding processing block of the base layer has an angular prediction mode.

In an embodiment, the most probable mode prediction modes are different from one another.

According to a further related aspect of the invention there is provided a method of encoding or decoding at least part of an image of an enhancement layer of video data, the video data including the enhancement layer and a base layer, the method comprising:

signalling, for the at least a part of the image, indicator data representative of the usability of prediction data of the base layer for encoding or decoding said at least part of an image, the indicator data being included in at least one of a slice header, a picture parameter set, a sequence parameter set or a video parameter set of said at least part of an image wherein the indicator data is representative of whether or not said image part employs coding modes using base layer prediction data for encoding or decoding An at least part of an image may correspond to groups of coding units, a tile, a slice or an image for example. In an embodiment the enhancement layer is composed of a plurality of coding units, the at least part of the image comprising at least two coding units.

A yet further aspect of the invention provides a method of encoding or decoding at least part of an image of an enhancement layer of video data, the video data including the enhancement layer and a base layer, the method comprising:

signalling, for the at least a part of the image, indicator data representative of the usability of prediction data of the base layer for encoding or decoding said at least part of an image, the indicator data being included in at least one of a slice header, a picture parameter set, a sequence parameter set or a video parameter set of said at least part of an image wherein the indicator data is representative of enabled coding modes In an embodiment the indicator data includes a flag indicative of whether (1) all available intra coding modes are enabled or (2) a predefined limited set of intra coding modes are enabled.

In an embodiment the indicator data includes a flag indicative of whether (1) all available motion vectors are enabled or (2) a predefined limited set of motion vectors are enabled for inter mode coding.

In an embodiment the indicator data includes a flag indicative of whether (1) all available motion vector predictors are enabled or (2) a predefined limited set of motion vector predictors are enabled for inter mode coding.

In an embodiment the indicator data includes a flag indicative of whether (1) all available contexts for entropy coding are enabled or (2) a predefined limited set of contexts for entropy coding are enabled.

In an embodiment the indicator data is representative of the type of data from the base layer which can be exploited.

In an embodiment the type of data includes one or more of the following texture data, residual data, mode data, motion vector data and entropy coding state.

Another aspect of the invention provides a method of encoding or decoding at least part of an image of an enhancement layer of video data, the video data including the enhancement layer and a base layer, the method comprising:

signalling, for the at least a part of the image, indicator data representative of the usability of prediction data of the base layer for encoding or decoding said at least part of an image, the indicator data being included in at least one of a slice header, a picture parameter set, a sequence parameter set or a video parameter set of said at least part of an image wherein the indicator data is representative of whether the enhancement layer or the base layer provides the prediction data for encoding or decoding of said at least part of an image.

In an embodiment the indicator data indicates if prediction data of the enhancement layer is to be replaced by prediction data of the base layer for encoding or decoding of the image portion.

In an embodiment the enhancement layer and the base layer are each composed of processing blocks, and wherein the prediction data of the enhancement layer corresponds to prediction data of processing blocks neighbouring the processing block of the image to be encoded and the prediction data of the base layer corresponds to prediction data of processing blocks of the base layer spatially corresponding to said neighbouring processing blocks of the enhancement layer.

In an embodiment the indicator data is included in a sequence parameter set or a video parameter set for said at least part of an image.

In an embodiment the indicator data is included in a sequence parameter set for said at least part of an image In an embodiment the indicator data is included in a picture parameter set for said at least part of an image In an embodiment the indicator data is included in a coding entity syntax of said at least part of an image Methods in accordance with some embodiments of the invention signal data indicative of the dependence or reliance of the enhancement layer on prediction data of the base layer for encoding or decoding Embodiments of the invention concern the addition of High Level Syntax Elements (HLSE) enabling the complexity and the efficiency of the Enhancement layer (EL) coding and decoding processes to be controlled, and enable:

efficient exploitation of the base layer information, while helping to reduce the encoding/decoding complexity and providing a spatial random access functionality for the EL, improvement in the coding efficiency and reduction of complexity when the base layer data is non-relevant for the EL.

A spatial random access functionality implies that regions (block, coding unit, tile, slice . . . ) of the EL image can be coded and decoded without needing to access any spatial neighbouring data from this image; the concept can be extended in the temporal dependency axis by considering that an EL region does not depend on any neighbouring data of the same image, or from any data of previously processed images that do not belong to the corresponding region in those previously processed images.

Another aspect of the invention provides a device for encoding or decoding at least part of an image of an enhancement layer of video data, the video data including the enhancement layer and a base layer, the device comprising:

signalling means for signalling, for the at least a part of the image, indicator data representative of the usability of prediction data of the base layer for encoding or decoding said at least part of an image, the indicator data being included in at least one of a slice header, a picture parameter set, a sequence parameter set or a video parameter set of said at least part of an image wherein the indicator data is representative of whether or not said image part employs coding modes using base layer prediction data for encoding or decoding.

In an embodiment, the enhancement layer is composed of a plurality of coding units, the at least part of the image comprising at least two coding units.

Another aspect of the invention provides a device of encoding or decoding at least part of an image of an enhancement layer of video data, the video data including the enhancement layer and a base layer, the device comprising:

signalling means for signalling, for the at least a part of the image, indicator data representative of the usability of prediction data of the base layer for encoding or decoding said at least part of an image, the indicator data being included in at least one of a slice header, a picture parameter set, a sequence parameter set or a video parameter set of said at least part of an image wherein the indicator data is representative of enabled coding modes In an embodiment, the indicator data includes a flag indicative of whether (1) all available intra coding modes are enabled or (2) a predefined limited set of intra coding modes are enabled.

In an embodiment, the indicator data includes a flag indicative of whether (1) all available motion vectors are enabled or (2) a predefined limited set of motion vectors are enabled for inter mode coding.

In an embodiment, the indicator data includes a flag indicative of whether (1) all available motion vector predictors are enabled or (2) a predefined limited set of motion vector predictors are enabled for inter mode coding.

In an embodiment, the indicator data includes a flag indicative of whether (1) all available contexts for entropy coding are enabled or (2) a predefined limited set of contexts for entropy coding are enabled.

In an embodiment, the indicator data is representative of the type of data from the base layer which can be exploited.

In an embodiment, the type of data includes one or more of the following texture data, residual data, mode data, motion vector data and entropy coding state.

Another aspect of the invention provides a device for encoding or decoding at least part of an image of an enhancement layer of video data, the video data including the enhancement layer and a base layer, the device comprising:

means for signalling, for the at least a part of the image, indicator data representative of the usability of prediction data of the base layer for encoding or decoding said at least part of an image, the indicator data being included in at least one of a slice header, a picture parameter set, a sequence parameter set or a video parameter set of said at least part of an image wherein the indicator data is representative of whether the enhancement layer or the base layer provides the prediction data for encoding or decoding of said at least part of an image.

In an embodiment, the indicator data indicates if prediction data of the enhancement layer is to be replaced by prediction data of the base layer for encoding or decoding of the image portion.

In an embodiment, the enhancement layer and the base layer are each composed of processing blocks, and wherein the prediction data of the enhancement layer corresponds to prediction data of processing blocks neighbouring the processing block of the image to be encoded and the prediction data of the base layer corresponds to prediction data of processing blocks of the base layer spatially corresponding to said neighbouring processing blocks of the enhancement layer.

In an embodiment, the indicator data is included in a sequence parameter set or a video parameter set for said at least part of an image.

In an embodiment, the indicator data is included in a sequence parameter set or a picture parameter set for said at least part of an image In an embodiment, the indicator data is included in a coding entity syntax of said at least part of an image.

According to yet another aspect, the invention also relates to a computer program product that can be loaded into a programmable apparatus, comprising sequences of instructions for implementing any of the methods briefly described above, when the program is loaded into and executed by the programmable apparatus. Such a computer program may be transitory or non-transitory. In an implementation, the computer program can be stored on a non-transitory computer-readable carrier medium.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:—

FIG. 1 schematically illustrates an example of data structure used in HEVC;

FIG. 2 schematically illustrates the relations between the different picture representations of images in a scalable encoding architecture;

Figure 5:
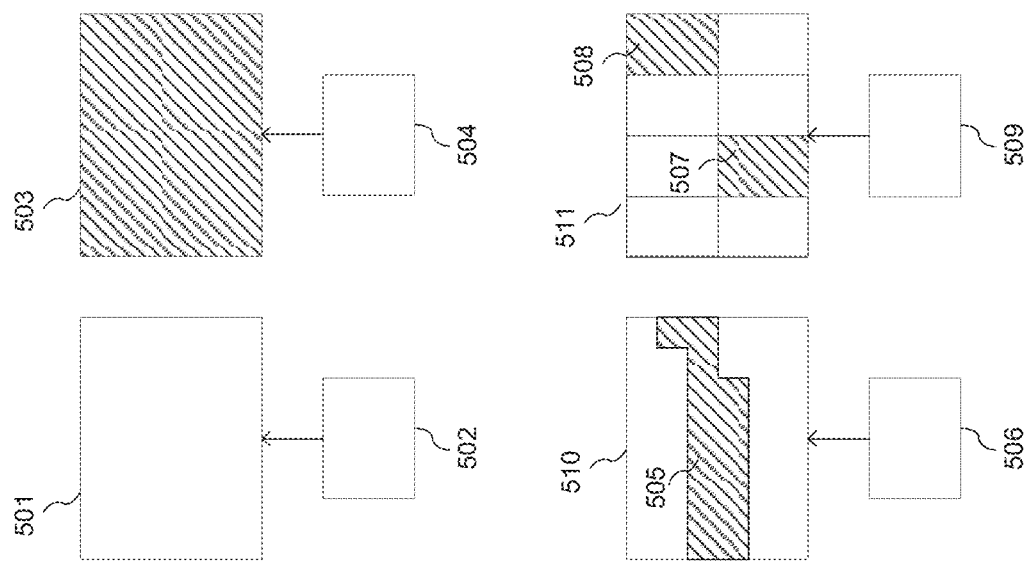

FIG. 5 schematically illustrates the usage of a first embodiment of the invention at the picture, slice or tile levels.

Figure 6:
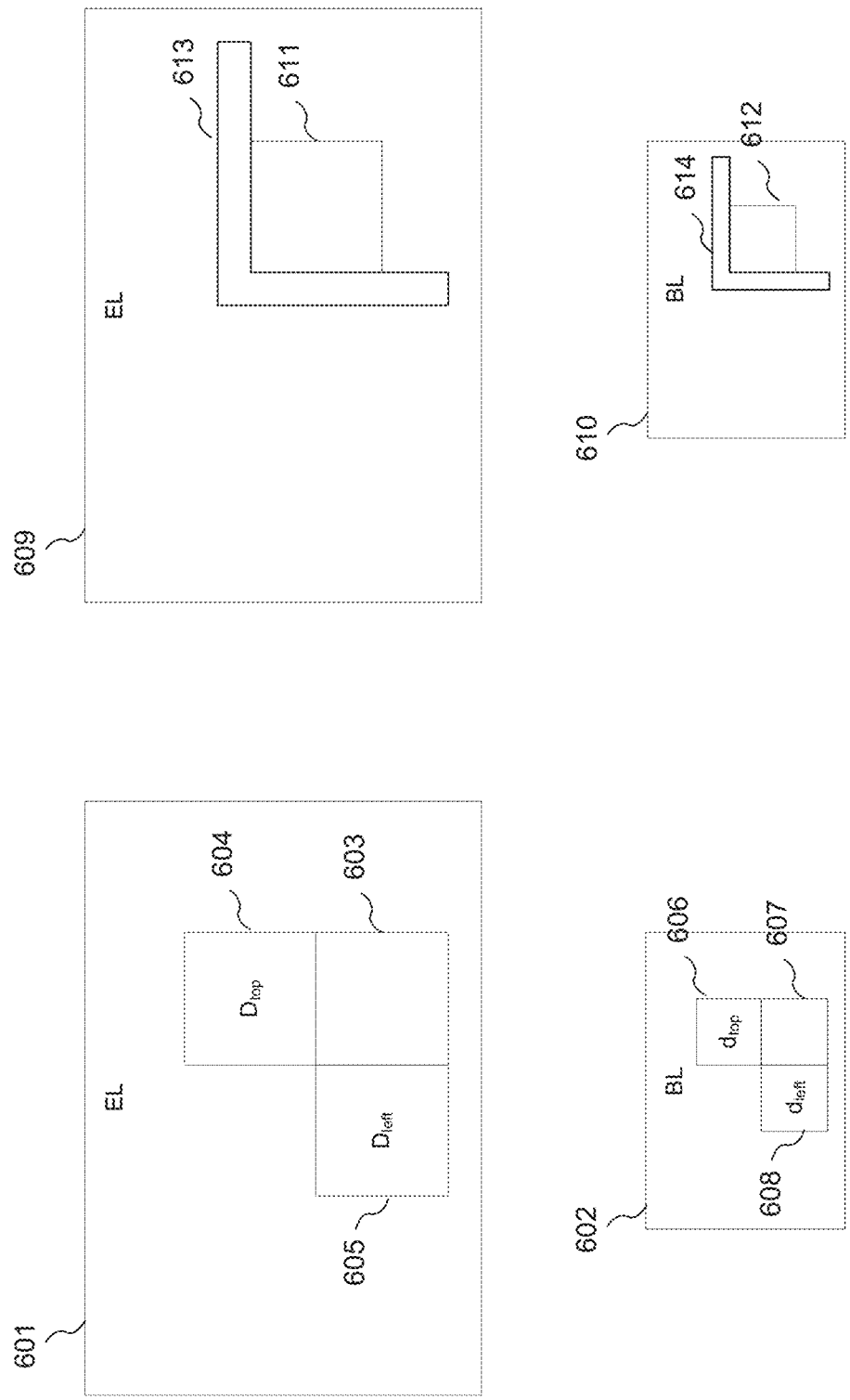

FIG. 6 schematically illustrates the spatial dependency in the coding process of an EL or BL CU.

Figure 7:
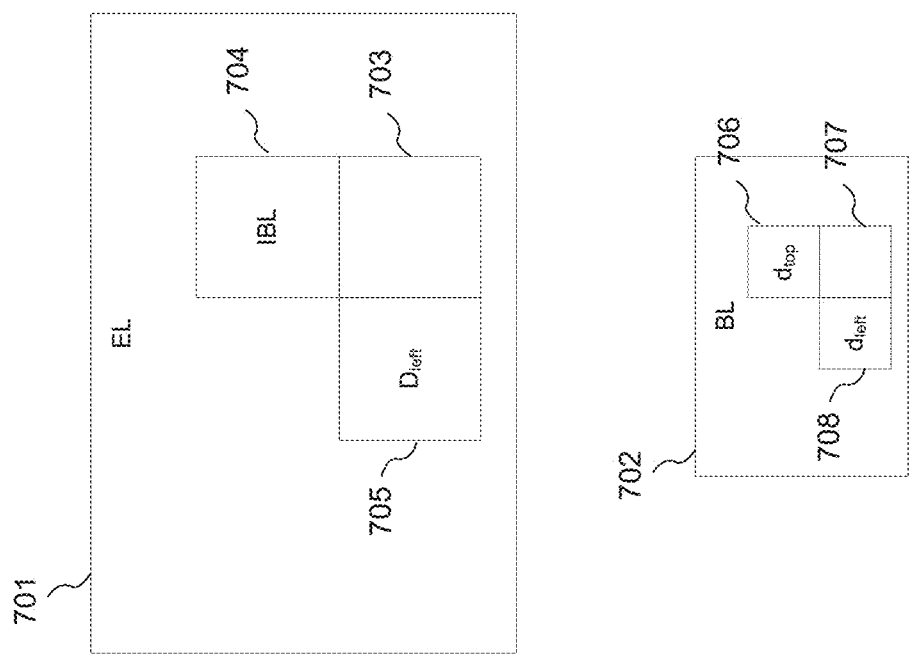

FIG. 7 schematically illustrates a specific case of EL spatial dependency from a neighbouring EL CU which is not Intra.

Figure 8:
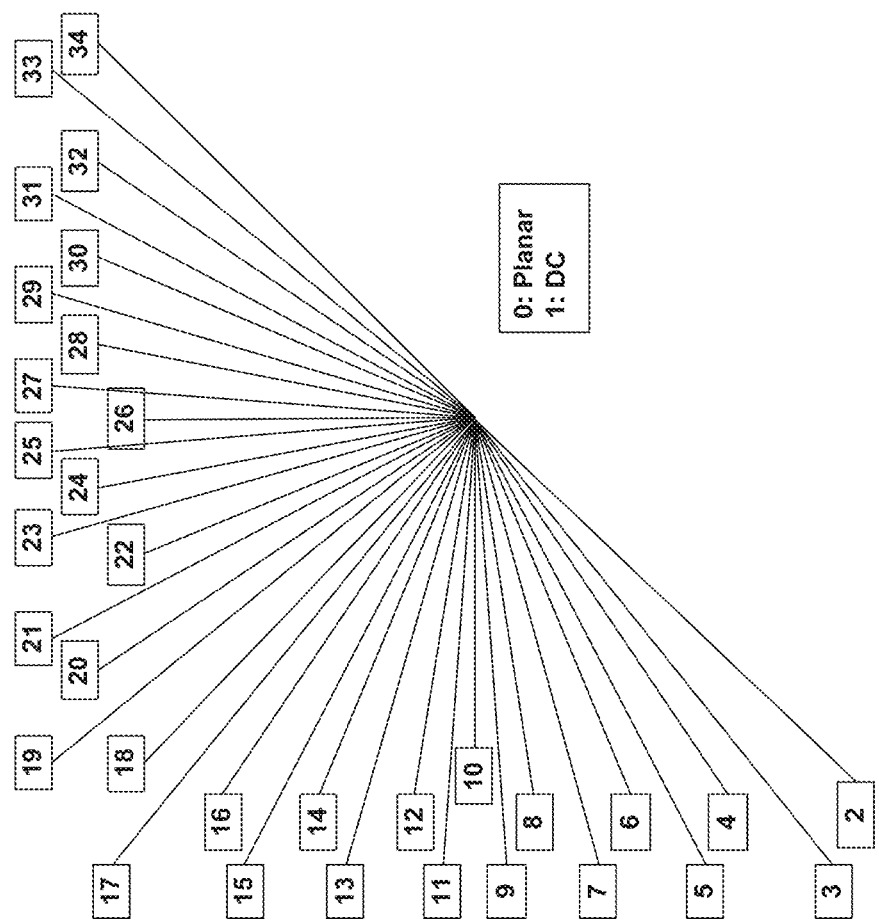

FIG. 8 schematically illustrates an intra mode numbering in HEVC.

Figure 9:
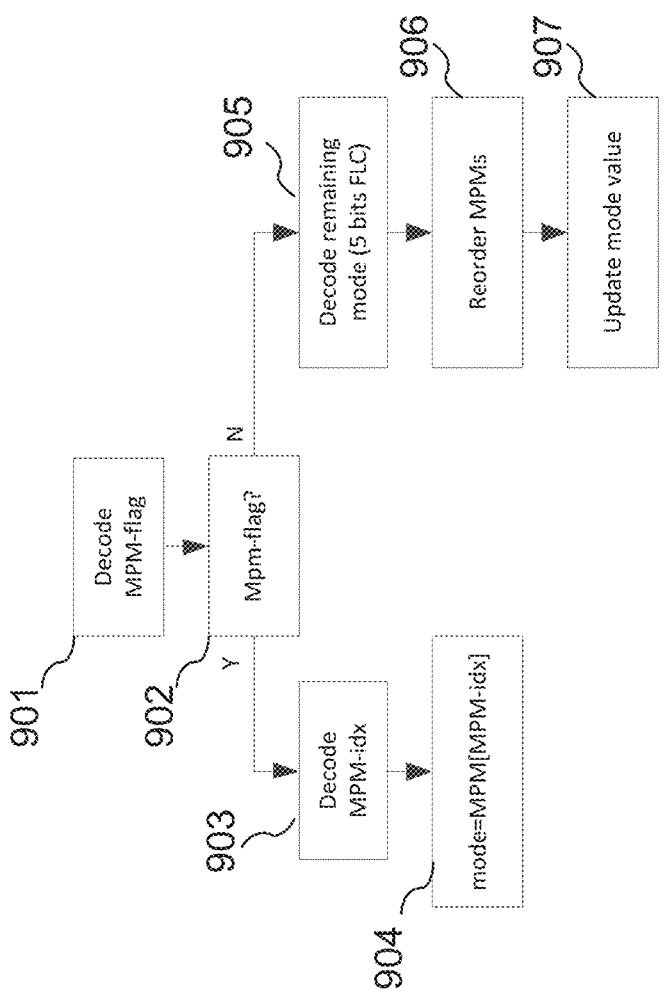

FIG. 9 is a flow chart illustrating steps of an intra mode decoding process in HEVC.

Figure 10A:
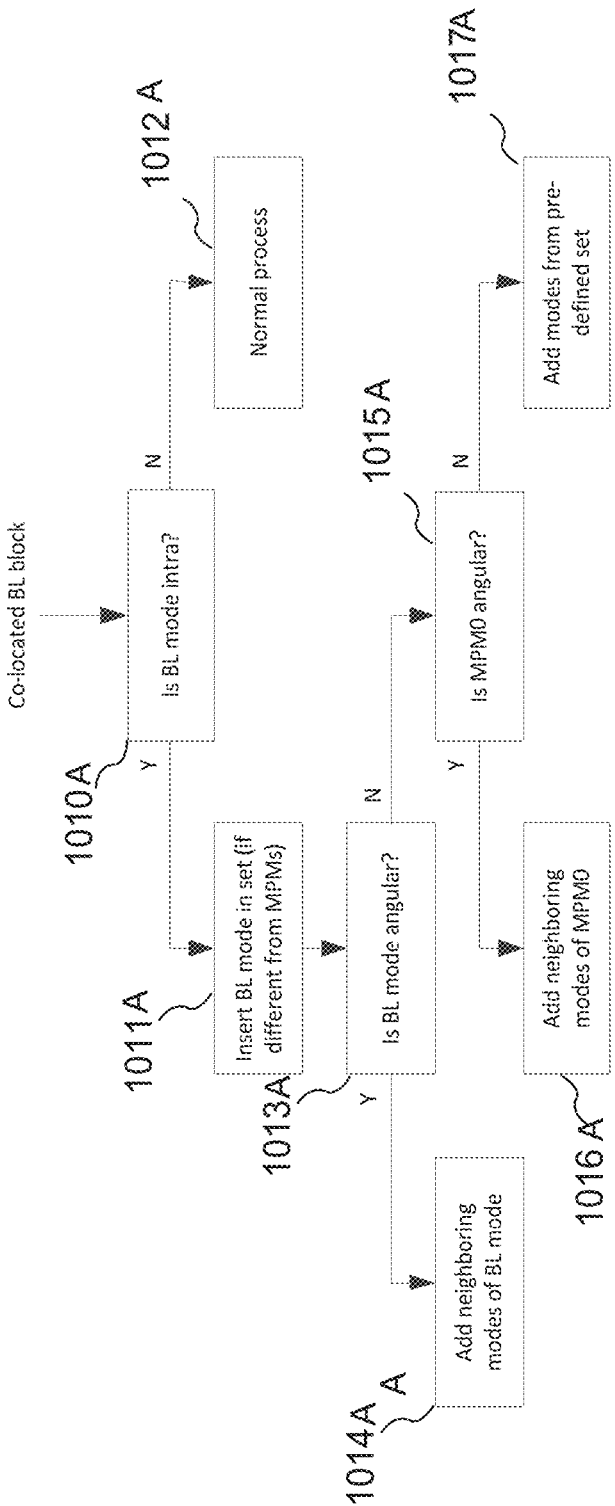
Figure 10B:
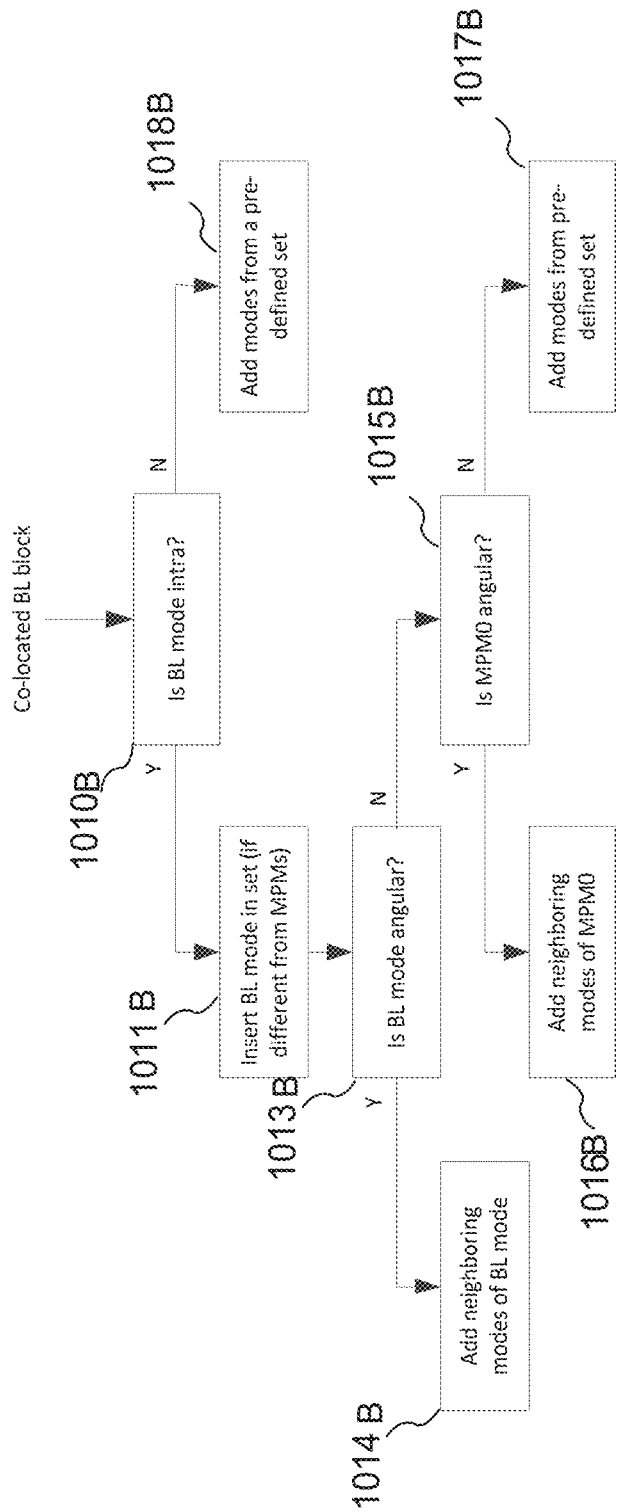
Figure 10C:
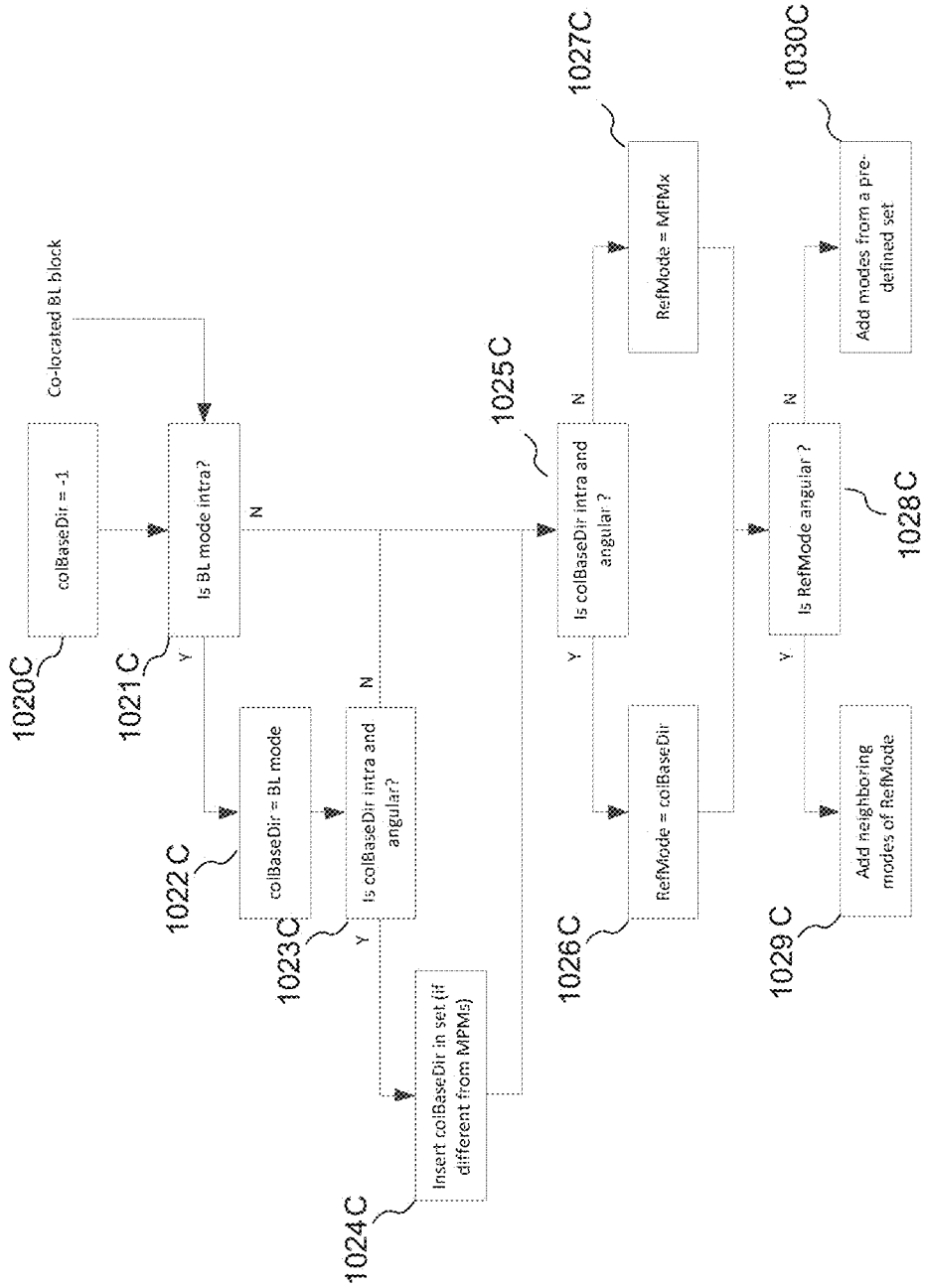
Figure 10D:
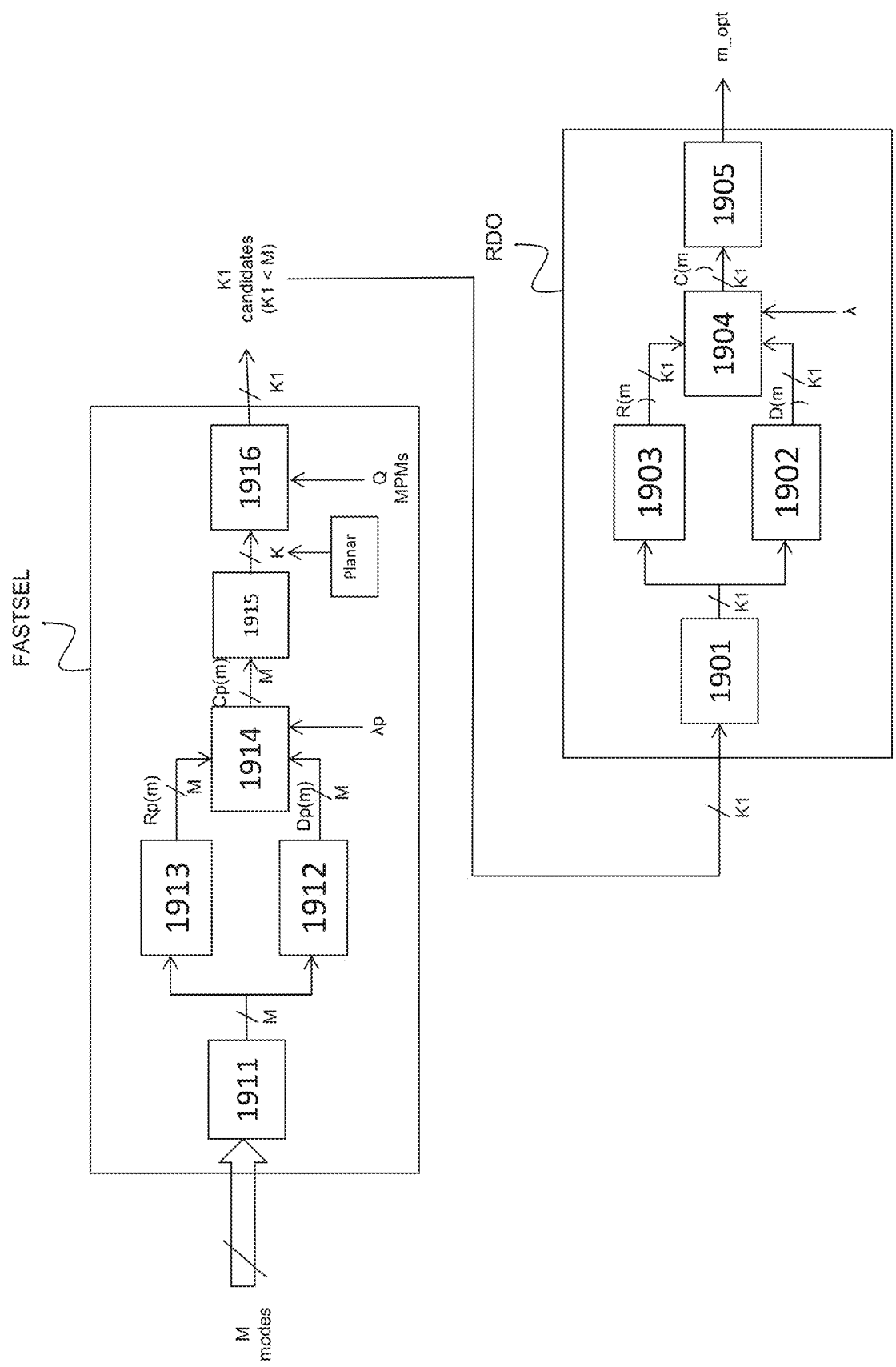
Figure 10E:
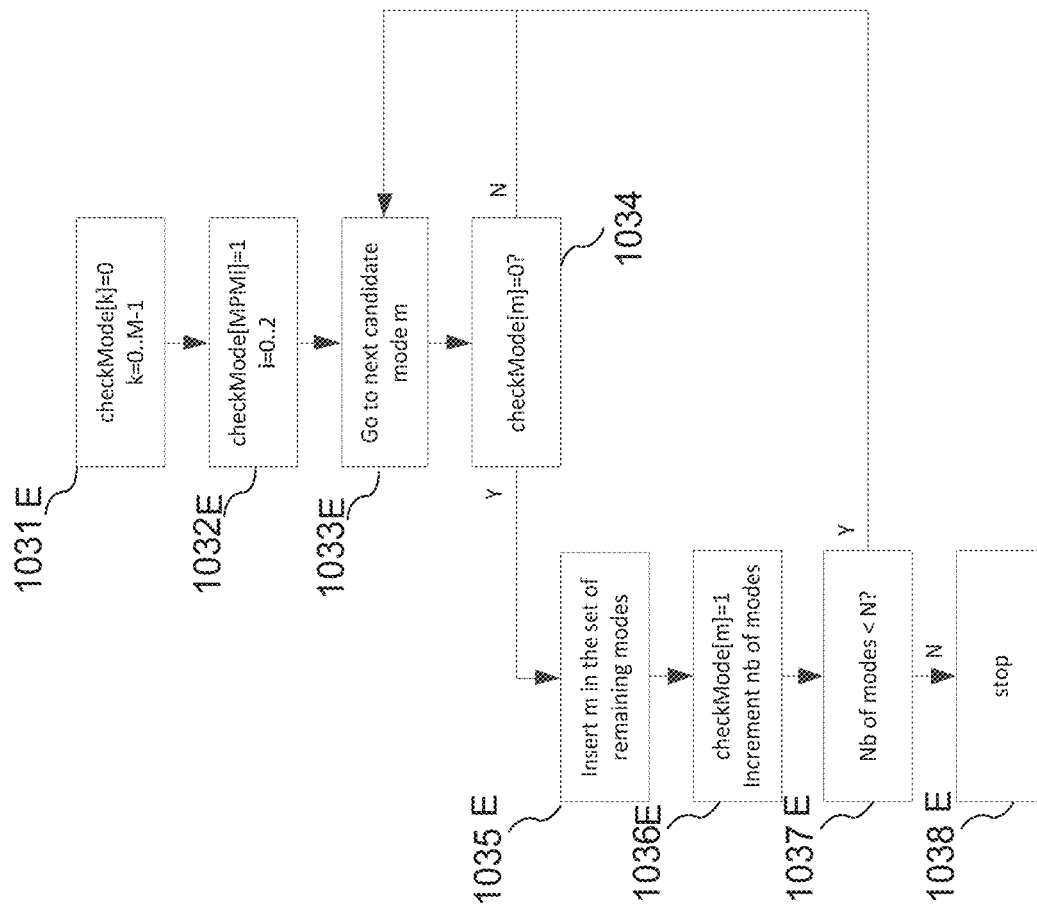
Figure 10F:
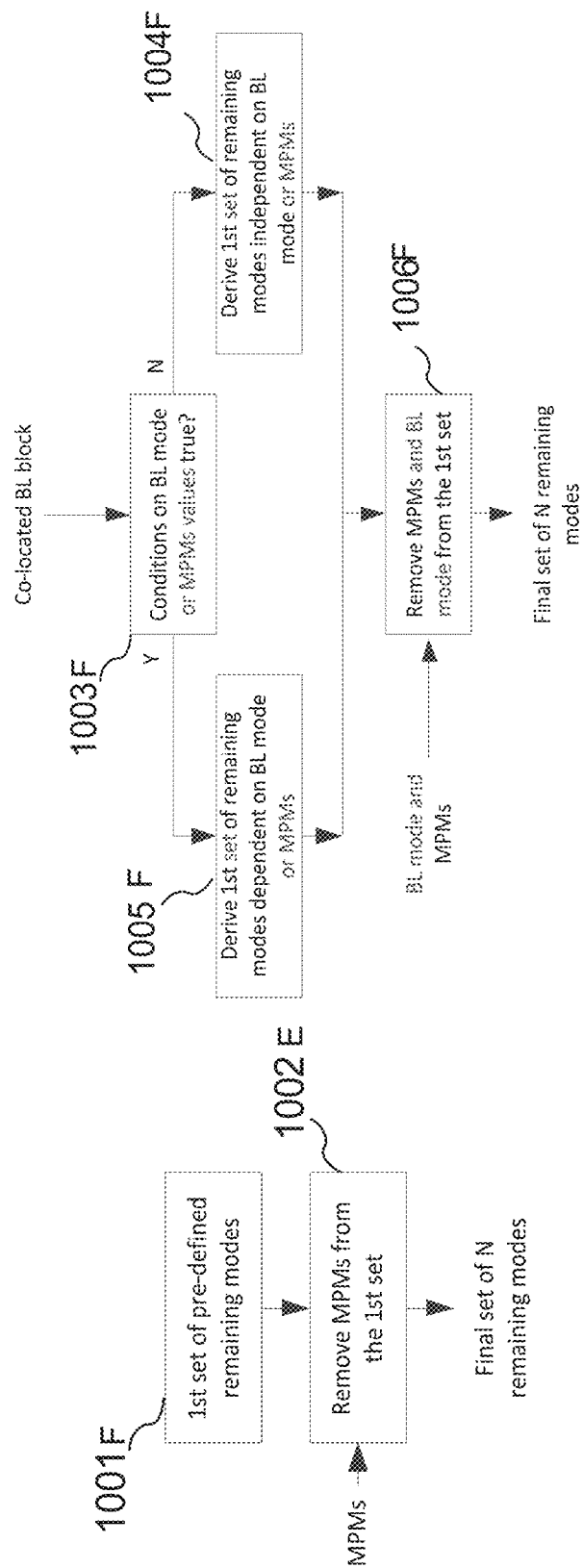

FIG. 10A is a flow chart illustrating steps of a remaining mode derivation process according to an embodiment of the invention FIG. 10B is a flow chart illustrating steps of a remaining mode derivation process according to another embodiment of the invention FIG. 10C is a flow chart illustrating steps of a remaining mode derivation process according to another embodiment of the invention FIG. 10D is a flow chart illustrating steps of a remaining mode derivation process according to an embodiment of the invention FIG. 10E is a flow chart illustrating steps of a remaining mode derivation process according to an embodiment of the invention FIG. 10F is a flow chart illustrating steps of a remaining mode derivation process according to an embodiment of the invention.

Figure 10G:
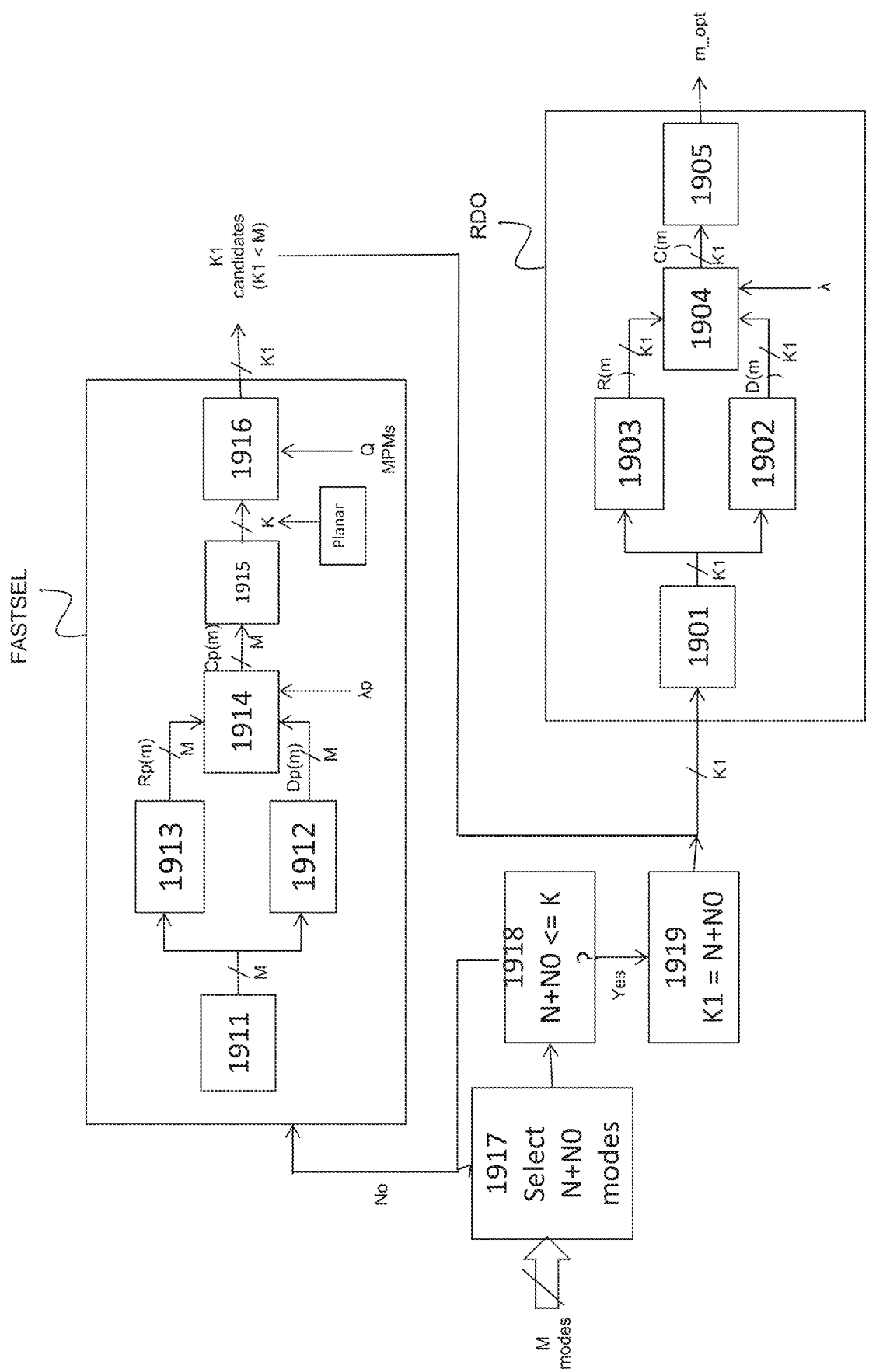
Figure 11:
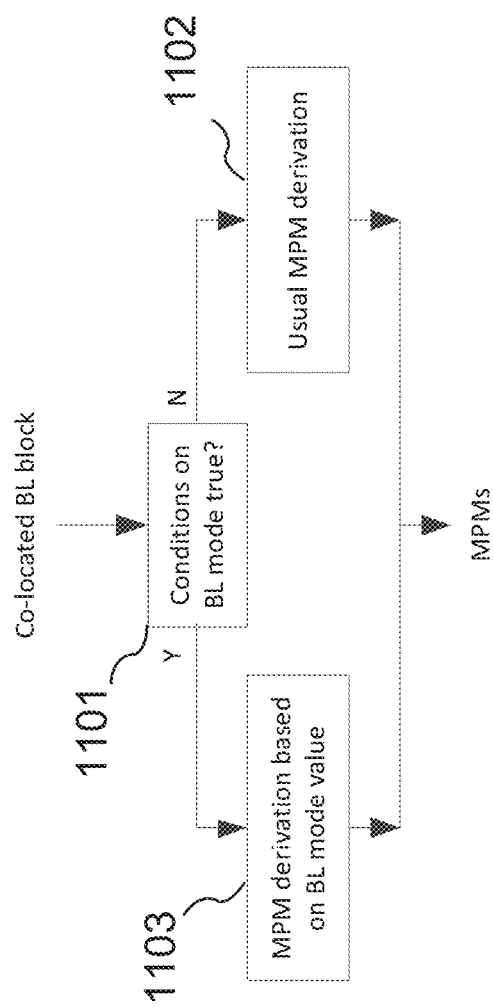

FIG. 10G is a flow chart illustrating steps of a remaining mode derivation process according to an embodiment of the invention FIG. 11 is a flow chart illustrating steps of a MPM derivation process according to an embodiment of the invention.

Figure 1:
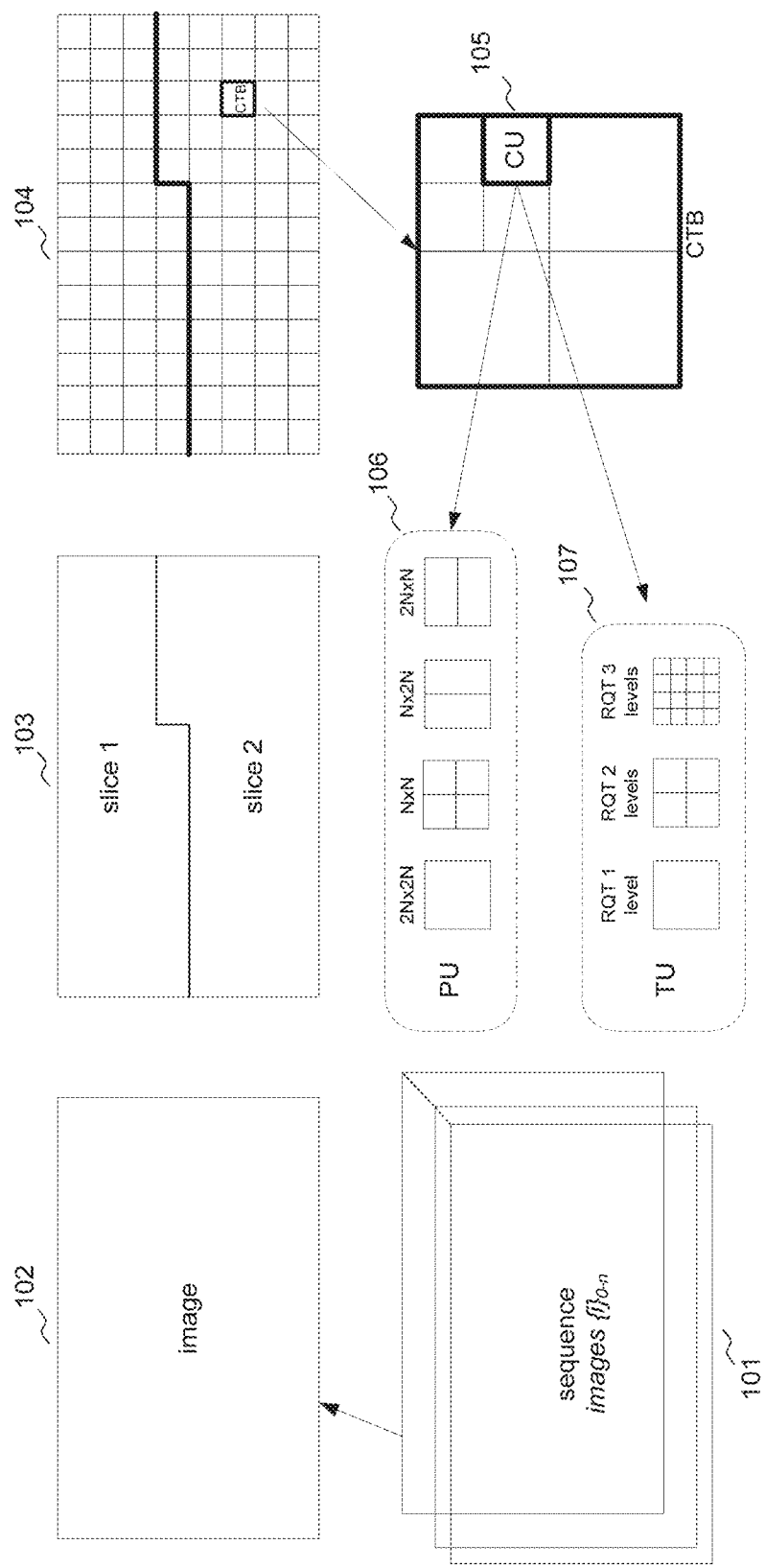
Figure 12:
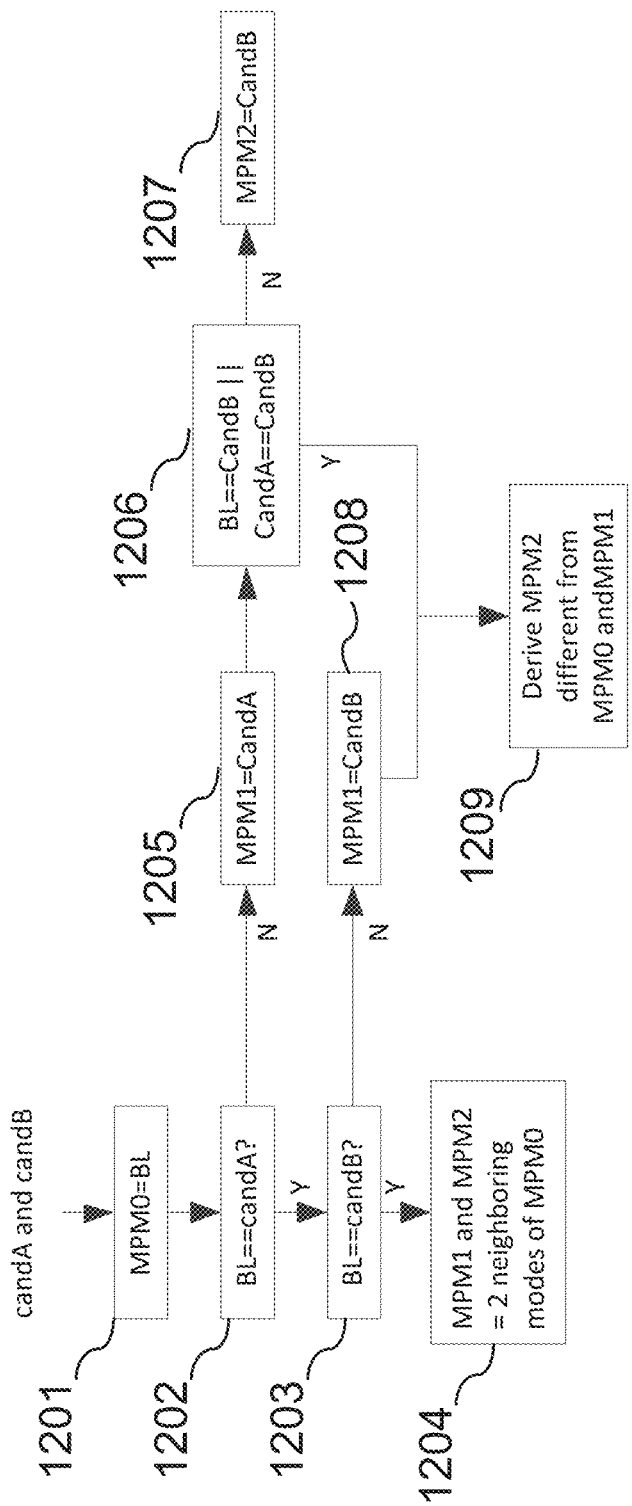
Figure 13:
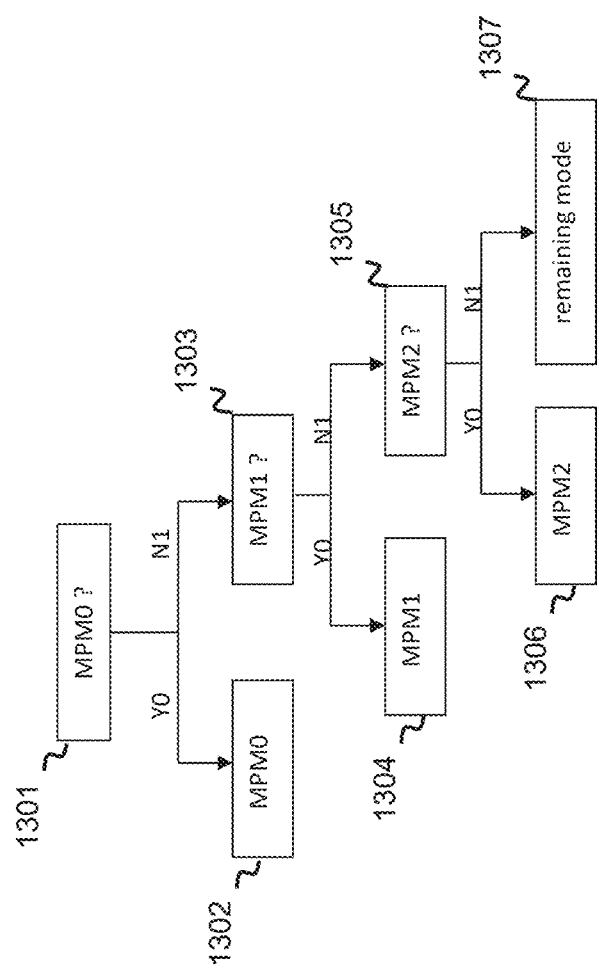
Figure 14:
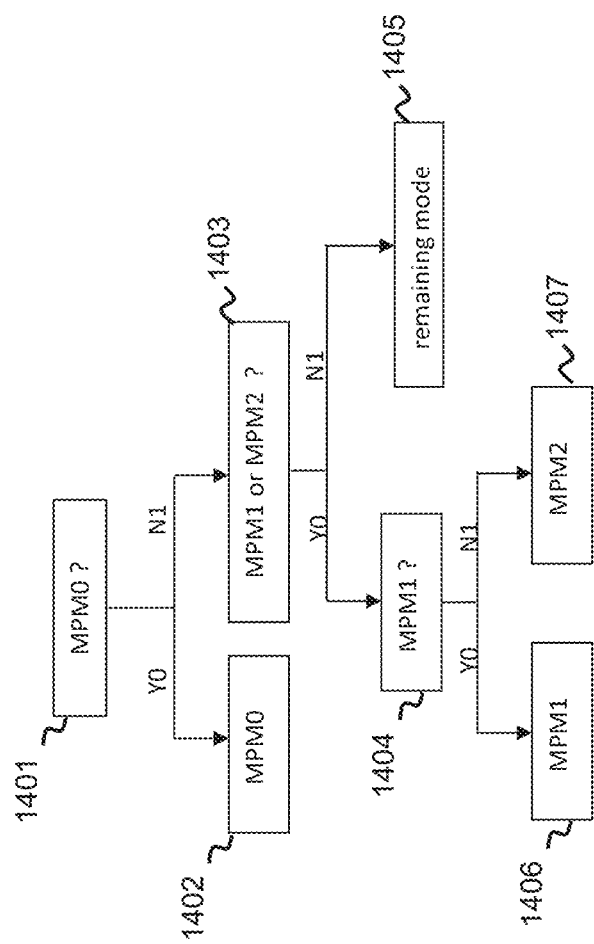
Figure 15:
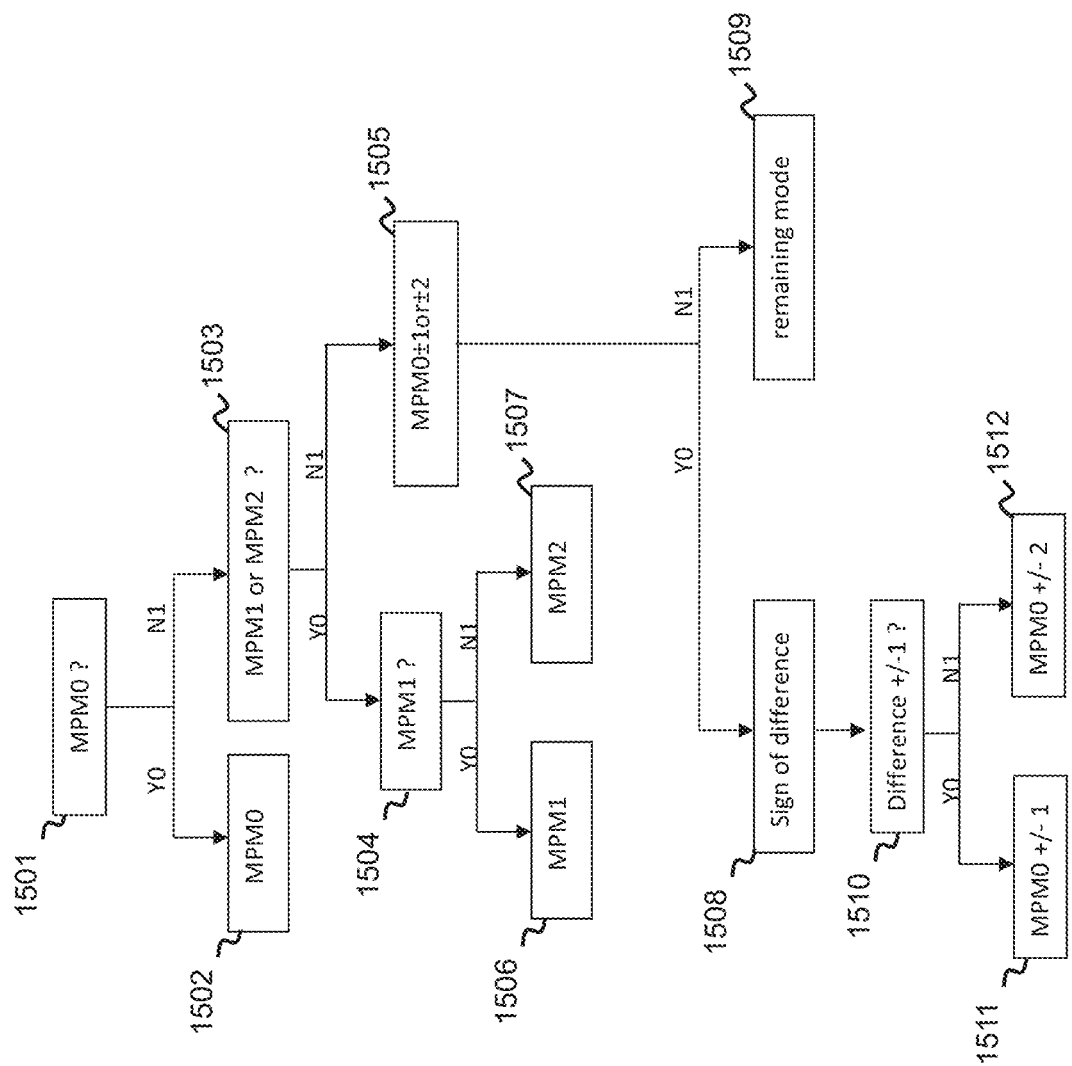
Figure 16A:
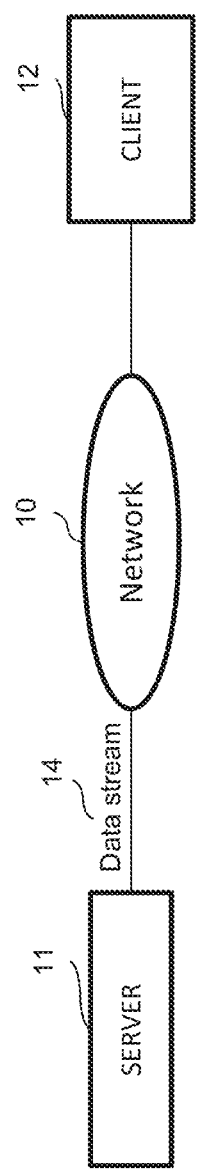
Figure 16B:
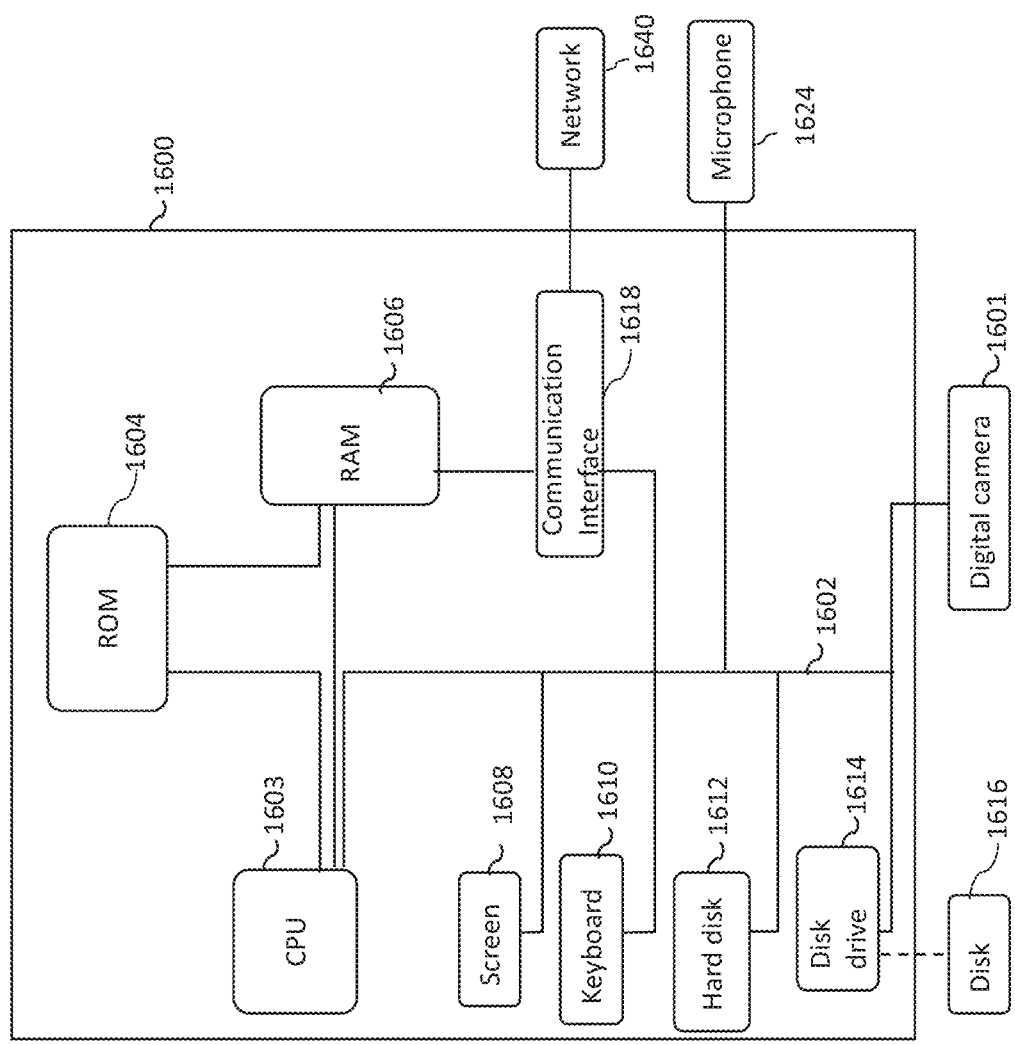

FIG. 12 is a flow chart illustrating steps of a MPM derivation process according to the invention when the conditions related to the BL modes are verified FIG. 13 is a flow chart illustrating steps of a MPM derivation process according to an embodiment of the invention FIG. 14 is a flow chart illustrating steps of a MPM derivation process according to an embodiment of the invention FIG. 15 is a flow chart illustrating steps of a MPM derivation process according to an embodiment of the invention FIG. 16A schematically illustrates a data communication system in which one or more embodiments of the invention may be implemented;

FIG. 16B is a schematic block diagram illustrating a processing device configured to implement at least one embodiment of the present invention;

FIG. 1 illustrates an example of coding structure used in HEVC. According to HEVC and one of its previous predecessors, the original video sequence 101 is a succession of digital images "images i". A digital image is represented by one or more matrices the coefficients of which represent pixels.

The images 102 are divided into slices 103. A slice is a part of the image or the entire image. In HEVC these slices are divided into non-overlapping Largest Coding Units (LCUs), also referred to as Coding Tree Blocks (CTB) 104, generally blocks of size 64 pixels×64 pixels. Each CTB may in its turn be iteratively divided into smaller variable size Coding Units (CUs) 105 using a quadtree decomposition. Coding units are the elementary coding elements and are constituted of two sub units which Prediction Unit (PU) and Transform Units (TU) of maximum size equal to the CU's size. Prediction Unit corresponds to the partition of the CU for prediction of pixels values. Each CU can be further partitioned into a maximum of 4 square Partition Units or 2 rectangular Partition Units 106. Transform units are used to represent the elementary units that are spatially transformed with a DCT-like or DST-like transform. A CU can be partitioned in TU based on a quadtree representation (107).

Each slice is embedded in one NAL unit. In addition, the coding parameters of the video sequence are stored in dedicated NAL units referred to as parameter sets. In HEVC and H.264/AVC two kinds of parameter sets NAL units are employed: first, the Sequence Parameter Set (SPS) NAL unit that gathers all parameters that are unchanged during the whole video sequence. Typically, it handles the coding profile, the size of the video frames and other parameters. Secondly, Picture (Image)Parameter Sets (PPS) codes the different values that may change from one frame to another.

An additional structure, referred to as Tile, is also defined in HEVC. A Tile is a rectangular set of LCUs. The division of each image or slice into tiles is a partitioning. This structure is well adapted to specify Regions of Interest. In HEVC, a Tile is built (coded and decoded) independently from neighbouring tiles of the same image. However a tile may be predicted from several tiles from previously processed images.

In summary, in HEVC, specific syntax headers or parameter sets are defined for the different levels:

Video level: a Video Parameter Set (VPS) is defined to specify the structure of the video; a video is made of several layers, corresponding to several versions of a same content, as for instance, different views of the same scene, different spatial resolutions of the same view; the VPS specifies the layered structure of the video content;

Sequence level: a Sequence Parameter Set (SPS) is defined to specify the structure of the sequence; in particular it defines the spatial resolution of the images, the frame rate, the chroma format, the bit-depth of luma and chroma samples; a SPS refers to a VPS via a VPS id.

Image level: a Picture (Image) Parameter Set (PPS) is defined to specify a set of features related to images of the sequence; parameters such as the default luma and chroma quantization parameters, the weighted prediction usage, the tiles usage, the loop filtering parameters are signaled in the PPS; a PPS refers to an SPS via an SPS id.

Slice level: a Slice Header (referred to as in the HEVC specification Slice Segment Header) is defined to specify a set of features related to the Slice of the image; similarly to the PPS, it specifies specific settings for the coding tools, such as the slice type (intra, inter), the reference images used for the temporal prediction, the activation of coding tools, the number and structure of tiles composing the slice; a Slice Segment Header refers to a PPS via a PPS id.

In what follows coding tools and coding modes will be described. Coding tools are the different processes that apply in the coding/decoding processes. For instance, intra coding, inter coding, motion compensation, transform, quantization, entropy coding, deblocking filtering. Coding modes relate to coding tools and correspond to different available parameterizations of these coding tools. For simpler notations, we will consider that both namings can be indifferently used.

Figure 2:
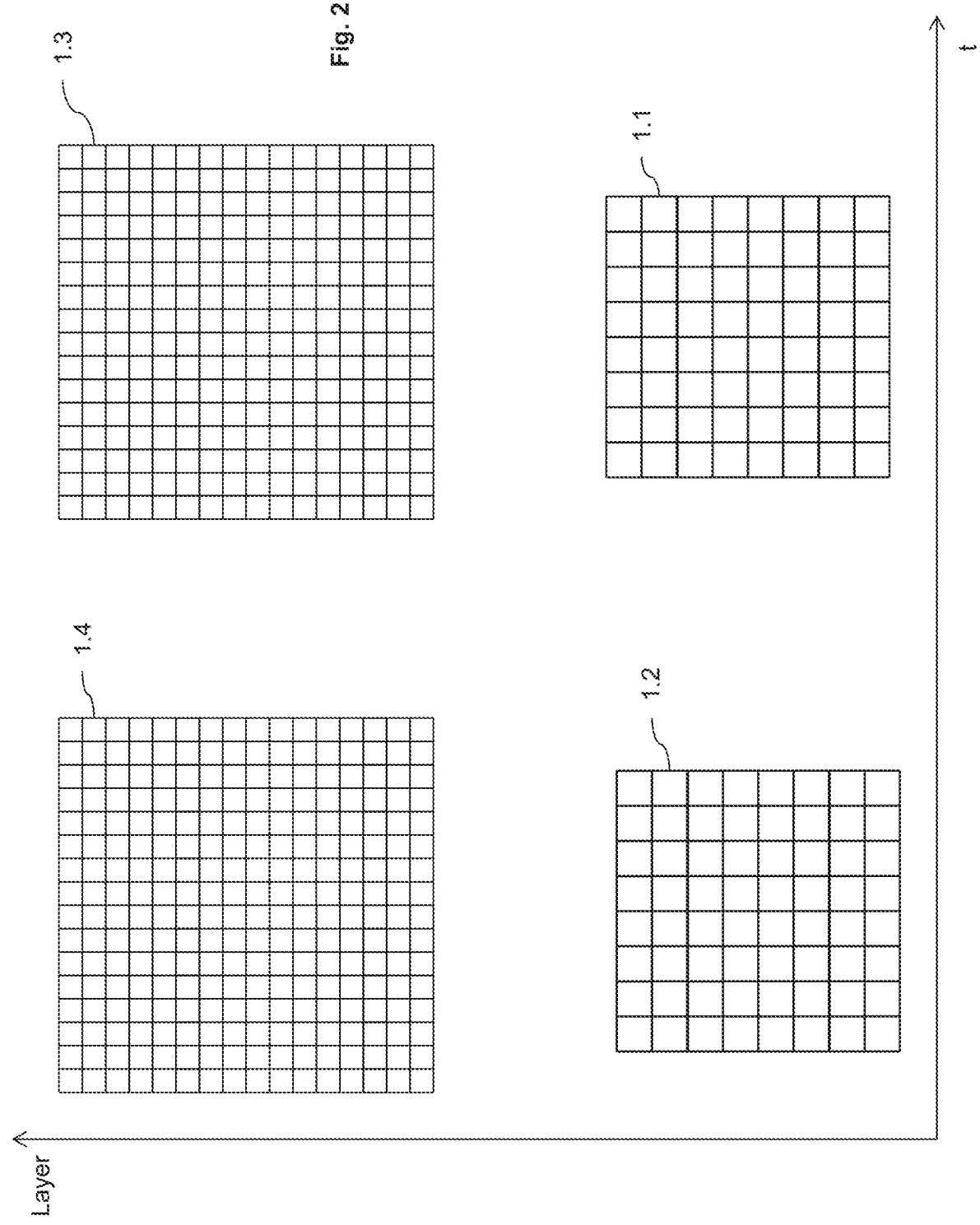

Scalable video coding is based on the principle to encode a base layer in low quality or resolution and some enhancement layers with complementary data allowing encoding or decoding some enhanced version of this base layer. The image within a sequence to be encoded or decoded is considered as several image representations, corresponding to each layer, the base layer and each of the actual enhancement layers. A coded image within a given scalability layer is referred to as an image representation level. Typically, the base layer image representation of an image corresponds to a low resolution version of the image while the image representations of successive layers correspond to higher resolution versions of the image. This is illustrated on FIG. 2, illustrating two successive images having two layers. Image 1.1 corresponds to the base layer image representation of image at time t. Image 1.2 corresponds to the base layer image representation of image at time t−1. Image 1.3 corresponds to the enhancement layer image representation of image at time t. Image 1.4 corresponds to the enhancement layer image representation of image at time t−1. In the following, to emphasize the fact that in scalable encoding, the encoding of an enhancement layer is made relatively to another layer used as a reference and that this reference layer is not necessarily the base layer, the term of reference layer will be used instead of base layer.

Typically the image is divided into coding units typically of square shapes, often referred to as blocks. The coding units are encoded or decoded using predictive encoding. Predictive encoding is based on determining data which values are an approximation of the pixel data to encode or decode, this data being referred to as a predictor of the coding unit. The difference between this predictor and the coding unit to encode or decode is referred to as the residual. Encoding consists, in this case, to encode the location of the predictor and the residual. A good predictor is a predictor which values are close to the values of the coding unit, leading to a residual having small values which could be efficiently encoded.

Each coding unit may be encoded based on predictors from previously encoded images in a coding mode referred to as "inter" coding. It may be noted that the term of previous does not refer exclusively to a previous image in the temporal sequence of video. It refers to the sequential encoding or decoding scheme and means that the "previous" image has been encoded or decoded previously and may therefore be used as a reference image for the encoding of the current image. It may be also encoded based on information already encoded and decoded in the image to encode. In this case, the predictor is obtained from the left and above border pixels of the coding unit and an intra prediction mode giving prediction direction. This predictive mode is referred to as "intra" coding. The coding unit may also be encoded based on predictors from base layer. Such predictive modes are referred to as "inter-layer" coding modes. Intra and Inter modes use data exclusively coming from the EL, while Inter-layer modes use data from the base layer (e.g. motion data, texture data).

Figure 3:
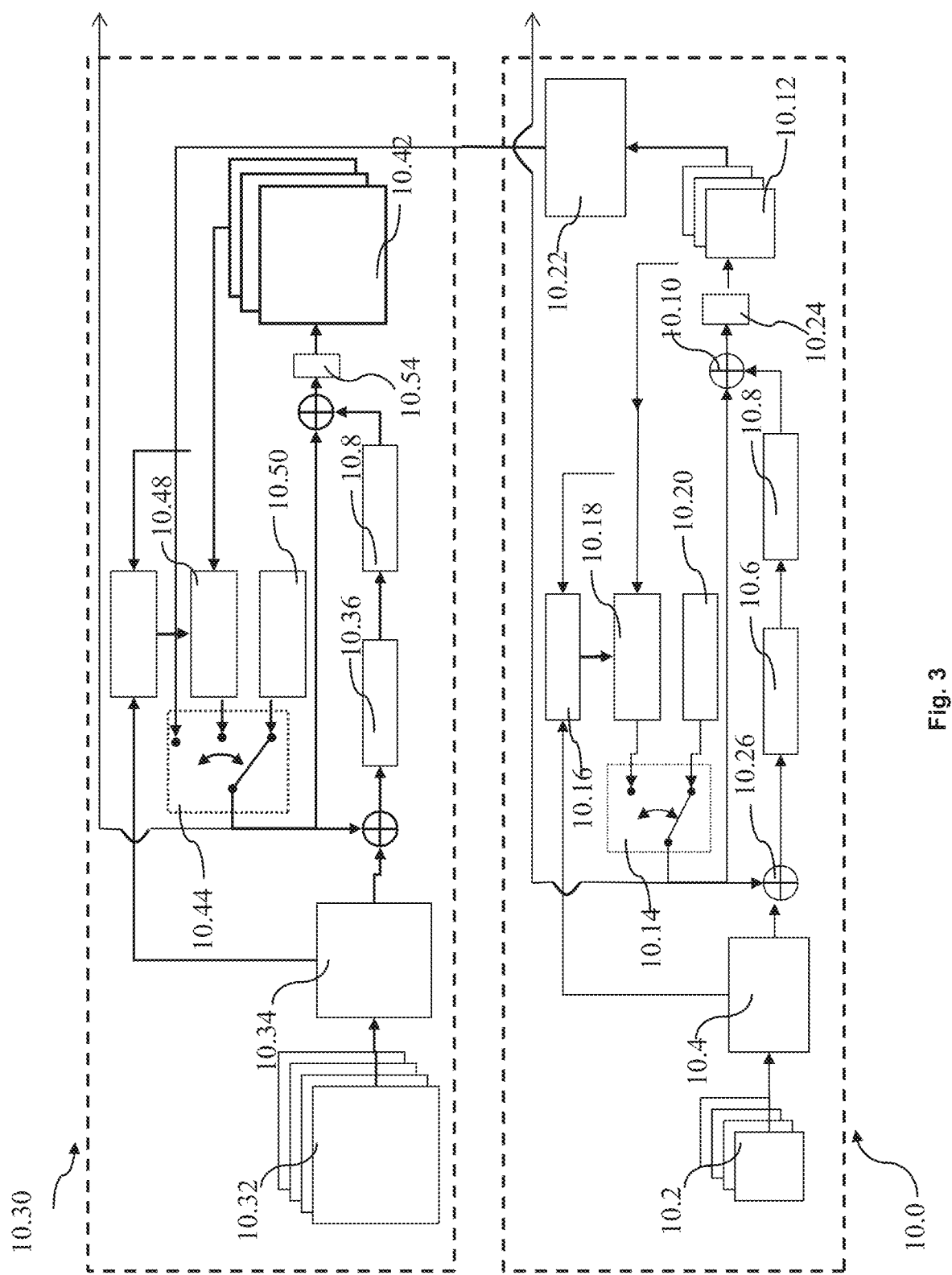
FIG. 3 is a block diagram illustrating an example of scalable video coder generating 2 scalability layers.

FIG. 3 is a block diagram of a typical scalable video coder generating two scalability layers. This diagram is organized in two stages 10.0, 10.30, respectively dedicated to the coding of each of the scalability layers generated. The numerical references of similar functions are incremented by 30 between the successive stages. Each stage takes, as an input, the original sequence of images to be compressed, respectively 10.2 and 10.32, possibly subsampled at the spatial resolution of the scalability layer at considered stage. Within each stage a motion-compensated temporal prediction loop is implemented.

The first stage 10.0 in FIG. 3 corresponds to the encoding diagram of an H.264/AVC or HEVC non-scalable video coder and is known to persons skilled in the art. It successively performs the following steps for coding the base layer. A current image 10.2 to be compressed at the input to the coder is divided into coding units, by the function 10.4. Each coding unit, first of all undergoes a motion estimation step 10.16, comprising a block matching algorithm, which attempts to find, among reference images stored in a buffer 10.12, reference prediction units for best predicting the current coding unit. This motion estimation function 10.16 supplies one or more indices of reference images containing the reference prediction units found, as well as the corresponding motion vectors. A motion compensation function 10.18 applies the estimated motion vectors to the reference prediction units found and copies the blocks thus obtained, which provides a temporal prediction block. In addition, an INTRA prediction function 10.20 determines the spatial prediction mode of the current coding unit that would provide the best performance for the coding of the current coding unit in INTRA mode. Next a function of choosing the coding mode 10.14 determines, among the temporal and spatial predictions, the coding mode that provides the best rate-distortion compromise in the coding of the current coding unit. The difference between the current coding unit and the prediction coding unit thus selected is calculated by the function 10.26, so as to provide a residue (temporal or spatial) to be compressed.

This residual coding unit then undergoes a spatial transform (such as the discrete cosine transformation or DCT) and quantization functions 10.6 to produce quantized transform coefficients. An entropy coding of these coefficients is then performed, by a function not shown in FIG. 3, and supplies the compressed texture data of the current coding units.

Finally, the current coding unit is reconstructed by means of a reverse quantization and reverse transformation 10.8, and an addition 10.10 of the residue after reverse transformation and the prediction coding unit of the current coding unit. Once the current image is thus reconstructed, it is filtered in step 10.24 then stored in a buffer 10.12 in order to serve as a reference for the temporal prediction of future images to be coded.

Function 10.24 performs post filtering operations comprising a deblocking filter and Sample adaptive Offset (SAO). These post filter operations aim at reducing the encoding artifacts.

The second stage in FIG. 3 illustrates the coding of a first enhancement layer 10.30 of the scalable stream. This stage 10.30 is similar to the coding scheme of the base layer, except that, for each coding of a current image in the course of compression, additional prediction modes, compared to the coding of the base layer, may be chosen by the coding mode selection function 10.44. These prediction modes referred to as "inter-layer prediction modes" may comprise several modes. These modes consist of reusing the coded data in a reference layer below the enhancement layer currently being coded as prediction data of the current coding unit.

Function 10.54 performs post filtering operations comprising a deblocking filter and Sample adaptive Offset (SAO). These post filter operations aim at reducing the encoding artifacts.

In the case where the reference layer contains an image that coincides in time with the current image, then referred to as the "base image" of the current image, the co-located coding unit, may serve as a reference for predicting the current coding unit. More precisely, the coding mode, the coding unit partitioning, the motion data (if present) and the texture data (residue in the case of a temporally predicted coding unit, reconstructed texture in the case of a coding unit coded in INTRA) of the co-located coding unit can be used to predict the current coding unit. In the case of a spatial enhancement layer, (not shown) up-sampling operations are applied on texture and motion data of the reference layer.

In addition to the Inter-layer prediction modes, each coding unit of the enhancement layer can be encoded using usual H.264/AVC or HEVC modes based on temporal or spatial prediction. The mode providing the best rate-distortion compromise is then selected by block 10.44.

Figure 4:
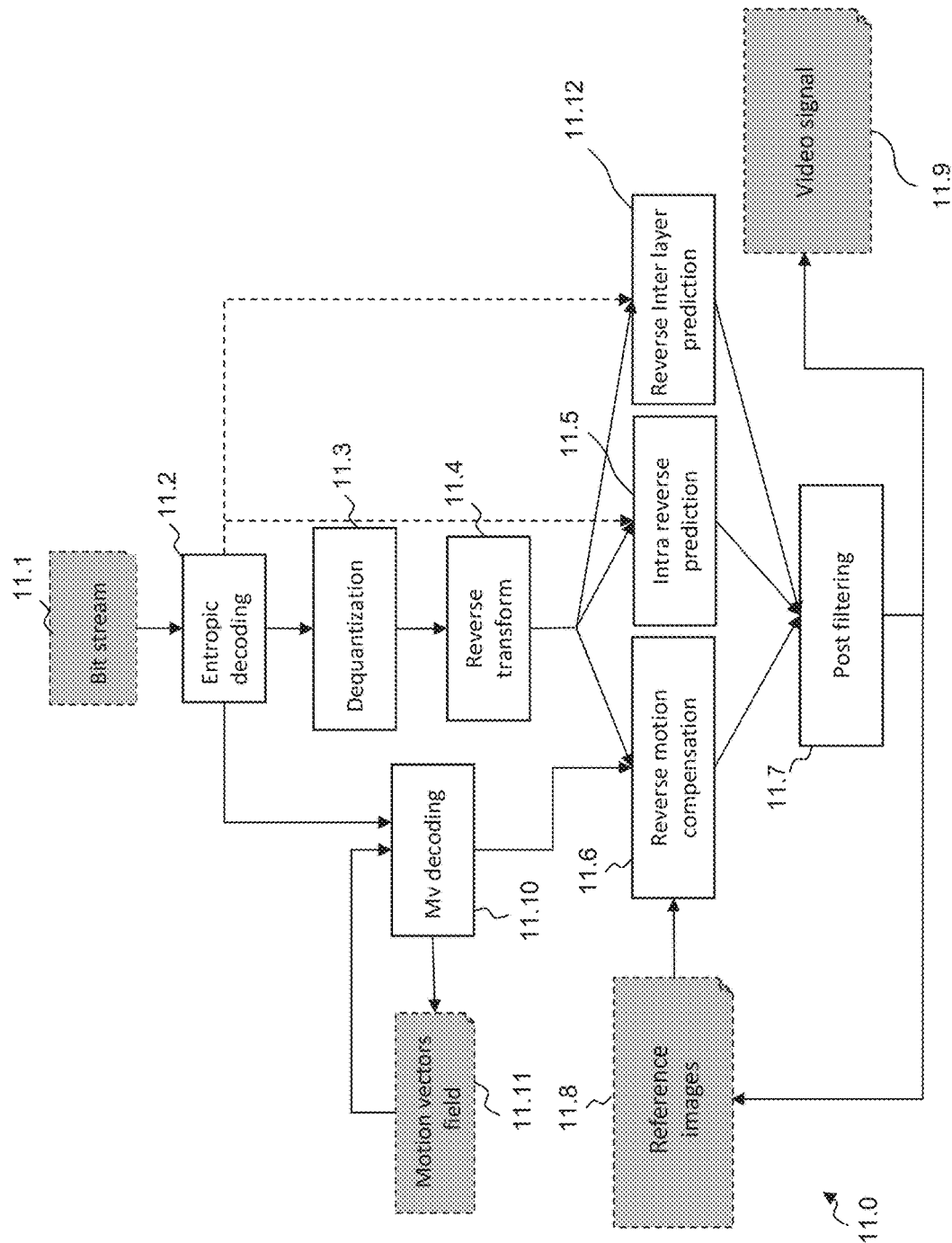
FIG. 4 is a block diagram of elements of a decoder which may be used to receive data from an encoder according an embodiment of the invention.

FIG. 4 is a block diagram of a scalable decoding method for application on a scalable bit-stream comprising two scalability layers, e.g. comprising a base layer and an enhancement layer. The decoding process may thus be considered as corresponding to reciprocal processing of the scalable coding process of FIG. 3. The scalable bit stream being decoded, as shown in FIG. 3, is made of one base layer and one spatial enhancement layer on top of the base layer, which are demultiplexed in step 11.11 of FIG. 3 into their respective layers. It will be appreciated that the process may be applied to a bit stream with any number of enhancement layers.

The first stage of FIG. 4 concerns the base layer decoding process. The decoding process starts in step 11.12 by entropy decoding each coding unit of each coded image in the base layer. The entropy decoding process 11.12 provides the coding mode, the motion data (reference images indexes, motion vectors of INTER coded coding units) and residual data. This residual data includes quantized and transformed coefficients. Next, these quantized transformed coefficients undergo inverse quantization (scaling) and inverse transform operations in step 11.13. The decoded residual is then added in step 11.16 to a temporal prediction area from motion compensation 11.14 or an Intra prediction area from Intra prediction step 11.15 to reconstruct the coding unit. Loop filtering is effected in step 11.17. The so-reconstructed residual data is then stored in the frame buffer 11.60. The decoded motion and temporal residual for INTER coding units may also be stored in the frame buffer. The stored frames contain the data that can be used as reference data to predict an upper scalability layer. Decoded base images 11.70 are obtained.

The second stage of FIG. 4 performs the decoding of a spatial enhancement layer on top of the base layer decoded by the first stage. This spatial enhancement layer decoding includes entropy decoding of the enhancement layer in step 11.52, which provides the coding modes, motion information as well as the transformed and quantized residual information of coding units of the enhancement layer.

A subsequent step of the decoding process involves predicting coding units in the enhancement image. The choice 11.53 between different types of coding unit prediction (INTRA, INTER, Inter-layer prediction modes) depends on the prediction mode obtained from the entropy decoding step 11.52. In the same way as on the encoder side, these prediction modes consist in the set of prediction modes of HEVC, which are enriched with some additional inter-layer prediction modes. The prediction of each enhancement coding unit thus depends on the coding mode signalled in the bit stream. According to the CU coding mode the coding units are processed as follows:

In the case of an inter-layer predicted INTRA coding unit, the enhancement coding unit is reconstructed by undergoing inverse quantization and inverse transform in step 11.54 to obtain residual data and adding in step 11.55 the resulting residual data to Intra prediction data from step 11.57 to obtain the fully reconstructed coding unit. Loop filtering is then effected in step 11.58 and the result stored in frame memory 11.80.

In the case of an INTER coding unit, the reconstruction involves the motion compensated temporal prediction 11.56, the residual data decoding in step 11.54 and then the addition of the decoded residual information to the temporal predictor in step 11.55. In such an INTER coding unit decoding process, inter-layer prediction can be used in two ways. First, the temporal residual data associated with the considered enhancement layer coding unit may be predicted from the temporal residual of the co-sited coding unit in the base layer by means of generalized residual inter-layer prediction. Second, the motion vectors of prediction units of a considered enhancement layer coding unit may be decoded in a predictive way, as a refinement of the motion vector of the co-located coding unit in the base layer.

In the case of an inter-later intra BL coding mode, the result of the entropy decoding of step 11.52 undergoes inverse quantization and inverse transform in step 11.54, and then is added in step 11.55 to the co-located coding unit of current coding unit in base image, in its decoded, post-filtered and up-sampled (in case of spatial scalability) version.

In the case of Base-Mode prediction the result of the entropy decoding of step 11.52 undergoes inverse quantization and inverse transform in step 11.54, and then is added to the co-located area of current CU in the Base Mode prediction in step 11.55; base mode prediction consists of inheriting in the EL block the block structure and motion data from the co-located BL blocks; then the EL block is predicted by motion compensation using the inherited motion data (for the parts of the EL block whose BL blocks are inter-coded) or using the intra BL mode (for the parts of the EL block whose BL blocks are intra-coded).

The term co-located in this document concerns pixels or set of pixels having the same spatial location within two different image or picture representations. It is mainly used to define two blocks of pixels, one in the enhancement layer, the second in the reference layer, having the same spatial location in the two layers (with a scaling factor in case of resolution change between two layers). It may also be used for two successive images in time. It may also refer to entities related to co-located data, for example when talking about co-located residual.

It may be noted that, at decoding time, when decoding a particular image representation, the only data we can use are the image representations already decoded. To fit the decoding and have a perfect match between encoding and decoding, the encoding of a particular image representation is based on decoded version of previously encoded image representations. This is known as the principle of causal coding.

Scalability involves specific coding/decoding processes that require implementation of additional coding tools compared to the HEVC non-scalable design. It can be interesting to have high-level mechanisms to enable/disable or to constraint these coding tools for complexity reduction or coding efficiency purposes. In addition scalability offers opportunities to improve the spatial random access capabilities and to reduce the complexity. It can be relevant to enable this feature at a high-level (application-dependent control).

When processing the Enhancement Layer, several points were identified by the inventors:
1. The base layer is not always relevant for the EL: it may turn out that in some coding configurations the base layer is of too poor quality to be efficiently used to process the enhancement layer; using it for processing the EL may cause losses in coding performance, while requiring useless added complexity;
2. High complexity of the enhancement layer coding: If all the coding modes are considered, the complexity to process the Enhancement Layer can become quite high; in particular, the addition of modes exploiting the base layer information noticeably increases the complexity;
3. The base layer can be used to avoid EL spatial dependencies: the EL coding of a given area (block, coding unit . . . ) makes use of spatially neighbouring data in the current image or in corresponding areas from previously coded images, creating a spatial dependency; in most cases, simply disabling this spatio-temporal dependency leads to significant coding efficiency losses. Embodiments of the invention set out to address these points.

In embodiments of the invention 3 High Level Syntax Elements (HLSE) are added in the EL bitstream to control the relation between the EL and the BL in the coding and decoding processes.

In one embodiment a HLSE (HLSE1) is added, preferably at the EL image or EL slice level, to signal if the EL image or EL slice uses the non-scalable syntax and coding modes or the full (non-scalable plus scalable) syntax and coding modes exploiting the base layer information; the goal of this feature is to increase the coding performance (useless syntax is not used) and to save processing resources when the BL image or BL slice is of low quality (point 1 mentioned above);

In another embodiment a HLSE (HLSE2) is added, preferably at the Video or Sequence level, to control the complexity of the coding tools and related syntax for the EL by setting more constraints on these tools; the goal is to reduce the complexity when the BL data can be efficiently used by the EL (point 2 mentioned above); embodiments related to the EL intra coding process simplification are provided;

In another embodiment a HLSE (HLSE3) is added, at the Video, Sequence, Image or Slice level, to control the spatial dependency feature for the EL; it indicates for which coding modes the EL data prediction and coding is achieved using neighbouring EL data or BL data; this enables to indicate which data (from EL or from BL) are used for the spatial dependency (point 3 mentioned above).

It will be appreciated that the above HLSEs may be used in combination; For example HLSE2 and HLSE3 can be used in combination. For instance it is possible to specify using the HLSE2 that the Sequence will use simplified coding tools and syntax for the EL. In addition, it can be indicated that spatial random access is ensured for the images of the sequence thanks to the HLSE3.

HLSE1 and HLSE2 can also be used in combination. For instance the HLSE2 specifies that the Sequence will use simplified coding tools and syntax for the EL, and for some images, HLSE1 indicates that in addition only non-scalable coding modes and syntax will be used. If HLSE3 indicates that the sequence is coded by using the BL data for the spatial dependency, then HLSE1 cannot indicate for any image of the sequence that non-scalable coding modes is used; these 2 features are contradictory. On the contrary, if HLSE3 indicates that the sequence is coded by using the usual EL data for the spatial dependency, then HLSE1 can take any value.

The 3 HLSEs can also be grouped together into one or two HLSEs.

In one embodiment of the invention control of the scalable property of the EL syntax and coding modes is provided When the BL data are not relevant for the EL coding, it is not relevant to spend useless syntax dedicated to scalable coding modes that exploit BL data to predict the EL data. The first proposed HLSE (HLSE1) is defined to address this issue. This HLSE is used to control the type of the EL syntax and coding modes.

The coding modes are of two types: non-scalable only, or non-scalable+scalable. The HLSE1 indicates if the EL uses the syntax and coding modes specified in the non-scalable only HEVC version, or if it uses, in addition to the non-scalable HEVC syntax and coding modes, specific scalable coding modes and their related syntax. Possibly a third modality can be considered and signalled, corresponding to scalable only modes.

In embodiments, the HLSE1 may be inserted in the Picture (Image) or Slice Header.

This is illustrated in FIG. 5, for example, where two EL images 501 and 503 with their corresponding BL image 502 and 504 are represented. The EL image 501 uses the non-scalable coding modes only, while the EL image 503 uses the non-scalable and scalable coding modes, which is signalled by the hatched area. Similarly the slice 505 from the EL image 510 uses the non-scalable and scalable coding modes, while the two other slices are coded using the non-scalable coding modes only. Similarly the tiles 507 and 508 from the EL image 511 use the non-scalable and scalable coding modes, while the other tiles are coded using the non-scalable coding modes only.

A further embodiment of the invention provides selection of the enabled coding modes. In this embodiment HLSE (HLSE2) is used to control the complexity of coding modes and related syntax for the EL. The BL data are often very relevant to predict the EL data. Instead of using a default wide range of values for the coding parameters, it is possible to limit this range to a reduced set of values around the coding parameters inherited from the BL. For instance, instead of enabling any of the possible values for the intra mode of a Coding Unit, a limited range around the co-located CU BL mode can be used. When this is possible, it is not necessary to enable a full flexibility for the coding modes for the EL, since inter-layer coding modes are most often used. It is therefore possible to limit the complexity of the process by reducing the flexibility of the coding modes to be used. The syntax can therefore also be reduced, possibly resulting in a reduced bitrate to code the EL data.

In one embodiment, the HLSE2 is inserted in the Sequence Parameter Set. In another embodiment, the HLSE2 is inserted in the Picture Parameter Set. In an embodiment, this HLSE is a single flag which indicates if the related EL structure (image, slice, tile . . . ) is coded using the full coding modes flexibility and the full related syntax, or using pre-defined limitations for the coding modes and related syntax.

For instance, if the flag is equal to 1, the syntax enables to signal in the bitstream for each CU any of the intra coding modes. If the flag is equal to 0, only a limited number of coding modes can be signalled in the bitstream for each CU, including the coding mode from the BL. This embodiment for intra mode coding will be further described in what follows.

In an embodiment, the HLSE2 is a codeword of several bits, corresponding to several concatenated flags, each one related to a set of coding modes and their related syntax. For instance, the first flag relates to the Intra coding modes (flag equal to 1 indicates that all the intra coding modes can be signalled for each CU, flag equal to 0 indicates that a limited number of intra coding modes can be signalled for each CU);

the second flag relates to the motion vectors coding (flag equal to 1 indicates that the motion vectors values for each CU coded in inter mode are not limited, flag equal to 0 indicates that the motion vectors values are constrained to a given range around the BL motion vectors from the co-located BL CU; or flag equal to 1 indicates that the full motion vectors predictors can be used for each CU coded in inter mode, flag equal to 0 indicates that a reduced set of motion vectors predictors can be used for each inter CU);

the third flag relates to the entropy coding process (flag equal to 1 indicates that the entropy coding process using all the contexts, flag equal to 0 that several contexts are removed for the entropy coding process).

These flags can of course also be signalled separately.

In an embodiment, several sets of coding configurations are pre-defined; for instance set0 is the configuration with all modes enabled, set1 corresponds to limitations on the intra mode coding process, set2 to set1 plus additional limitations on the motion vectors coding process, set3 to set2 plus additional limitations on the entropy coding process. In this embodiment the HLSE2 is a codeword related the set value.

When coding the EL, several types of data from the BL can be exploited: the reconstructed BL image (also called texture), the BL prediction residual, the BL modes per CU, the BL motion data, the BL entropy coding states. This involves storing these data, and due to memory limitations it may be beneficial to constraint the usage of these data. In an embodiment, the HLSE2 indicates which type of BL data can be exploited in the EL. For instance, the HLSE2 can indicate that 1) the EL can only exploit the BL texture, or 2) it can exploit the BL texture and residual, or 3) it can exploit the BL texture, residual and syntax (modes, motion data) or 4) it can exploit the BL texture, residual, syntax (modes, motion data) and entropy coding states.

In a further embodiment the HLSE is used to limit EL prediction from BL only. In principle, when a CU is processed (at the encoder or decoder), data from its neighbouring CUs can be used to predict or to code (by the entropy coding engine) its own data. This is illustrated in FIG. 6. The CU 603 from the EL image 601 uses data from neighbouring EL CUs top 604 (data Dtop) and left 605 (data Dleft) to process its own data. Similarly, the CU 607 from the BL image 602 uses data from neighbouring BL CUs top 606 (data dtop) and left 607 (data dleft) to process for its own data. Another example is shown in FIG. 6, where the EL block 611 uses neighbouring samples 613 to predict the block. This principle generates a spatial dependency which strongly limits spatial random access capabilities.

When considering the EL image, it is possible, in order to reduce this spatial dependency limitation, to replace the neighbouring EL data of an EL CU by the BL data co-located with the neighbouring CUs of the current EL CU. This can be done at a given granularity level, for instance at the LCU level (all data of the LCU requiring access to external spatial data use upsampled data from the BL co-located with these external spatial EL data). The granularity corresponds to a given coding entity level, for instance the CU level, the LCU level, the Tile level, the Slice level.

For instance, referring to FIG. 6, if EL blocks 604 and 605 are external to the coding entity to which the block 603 belongs, the data Dtop from EL block 604 and Dleft from EL block 605 are replaced by the data, possibly upsampled and filtered, dtop from BL block 606 and dleft from BL block 608 for the prediction of block 603. This replacement is only done for the prediction and coding of block 603, the actual data of block 604 and 605 remaining their true data Dtop and Dleft.

Another example in FIG. 6 is the replacement of EL neighbouring samples 613 by BL samples 614, possibly upsampled and filtered, to predict the EL block 611.

The third proposed HLSE (HLSE3) is used to control the spatial dependency of the coding process of the EL data. It indicates for all or for sets of coding tools if they need to replace EL data by BL data when these data are accessed in external neighbouring EL coding entities of a given EL coding entity. This HLSE3 is preferably added at the Video or Sequence level.

In an embodiment, this HLSE3 is signalled at the Image or Slice level. It may turn out that for some images, it is possible to completely remove the spatial dependency on the borders of the coding entities without significant coding efficiency loss. For such images, it is therefore not required to access to BL data co-located with these coding entities external data. For other images of the same sequence, it may turn out that fully removing the spatial dependency on the borders of the coding entities will have a huge impact on the coding quality, and therefore it is beneficial to access to BL data co-located with these coding entities external data. It is consequently interesting to be able to control this spatial dependency at the image or slice level.

In an embodiment, one or several syntax elements are inserted to indicate the spatial random access granularity level (for instance, the structure of the tiles partitioning, the size M and N of the LCUs groups constituting the coding entities).

In an embodiment, the HLSE3 is a flag indicating if for the coding of an EL coding entity of a given granularity level, spatial EL dependency is possible, or if it is not possible and that the BL data co-located with neighbouring EL CUs external to the EL coding entity are used in place of the neighbouring EL data.

In an embodiment, the HLSE3 is a codeword of several bits, corresponding to several concatenated flags, each one related to a set of coding modes. For instance:

the first flag relates to the Intra coding modes (flag equal to 1 indicates that the normal EL spatial dependency is used for intra modes coding, flag equal to 0 indicates that the BL intra coding modes from CUs co-located with neighbouring EL CUs external to the EL coding entity are used in place of the neighbouring EL intra coding modes);

the second flag relates to the motion vector coding (flag equal to 1 indicates that the normal EL spatial dependency is used for motion vector coding, flag equal to 0 indicates that the BL motion data from CUs co-located with neighbouring EL CUs external to the EL coding entity are used in place of the neighbouring EL motion data);

the third flag relates to the entropy coding process (flag equal to 1 indicates that the normal contexts are used for the entropy coding, flag equal to 1 indicates that if contexts are derived from data from EL CUs external to the EL coding entity, then these data are replaced by the data from the BL CUs co-located with these external EL CUs).

These flags can of course also be signalled separately.

FIG. 7 corresponds to a more specific embodiment, partly related to the spatial dependency. In this figure, it is shown that the EL block 704 uses as coding mode the mode IntraBL (noted IBL) which does not belong to the set of intra coding modes. Block 705 is coded as an intra block with intra mode Dleft. For the prediction of the intra mode of the current EL block 703, the block 704 is therefore considered as non intra. In this embodiment, it is proposed for such blocks (considered as non-intra) to substitute their coding mode for intra mode prediction by the mode dtop from the co-located block (block 706 in FIG. 7) when this co-located block is intra coded. For the left EL block 705, its mode Dleft can be kept for the intra mode prediction. HLSE3 can be used also to enable/disable this feature.

This section may be applied to embodiments of the invention relating to the control of the EL coding tools complexity by the HLSE2. In these embodiments, alternate intra mode coding processes are provided, in place of the default intra mode coding process.

In HEVC, intra prediction of a given block is based on the neighbouring samples of this block. For instance, in FIG. 6, samples of block 611 are predicted using the neighbouring reconstructed samples 613. The intra prediction is achieved using one of the 35 specified intra prediction modes. 2 of these modes are non-directional (modes DC and Planar) and 33 of these modes are directional (the samples in the block are predicted from the neighbouring samples in a given direction). The numbering of the 35 modes is shown in FIG. 8. It may be noted in particular that the two non-angular modes are numbered 0 and 1, and the angular modes are numbered from 2 to 34.

The intra mode coding process is based on the usage of 3 Most Probable Modes (MPMs), computed using the neighbouring CUs mode. The 3 MPMs are enforced to be mutually different. Then there are 32 so-called 'remaining modes' in addition to these 3 MPMs.

At the encoder side, a first flag is coded to indicate if the mode is one of the MPMs or not. If the selected mode is among the 3 MPMs, up to 2 additional bits are coded to indicate which one of the 3 MPMs is used. If the selected mode is not among the 3 MPMs, 5 additional bits are coded to indicate which one of the 32 remaining modes is used.

Symmetrically, at the decoder side, a first flag is decoded to know if the mode is one of the MPMs or not. If the flag indicates that the selected mode is among the 3 MPMs, up to 2 additional bits are decoded to know which one of the 3 MPMs is used. If the flag indicates that the selected mode is not among the 3 MPMs, 5 additional bits are decoded to know which one of the 32 remaining modes is used.

The corresponding decoding process is shown in FIG. 9. First a flag MPM_flag (of name prev_intra_luma_pred_flag in the HEVC specification) is decoded in step 901. If this flag is equal to 1 (checking done in step 902), an index MPM-idx (of name mpm_idx in the HEVC specification) is decoded in step 903. The mode is the MPM of index MPM-idx (step 904). If the MPM-flag is equal to 0 (checking done in step 902), the remaining mode (of name rem_intra_luma_pred_mode in the HEVC specification) of 5 bits is decoded in step 905. After having ordered the MPMs (in step 906), the remaining mode value is updated based on the value of the MPMs in step 907. The result corresponds to the mode.

In one embodiment of the invention, a simplified process is proposed for the remaining mode coding in the intra mode coding process. The principle is to keep 3 MPMs and to reduce the number N of remaining modes. Preferably, the number N of remaining modes is a power of 2: $N=2^K$ with $K<5$. This modification first reduces the complexity of the encoding process.

It can be also proposed to reduce the number of MPMs to less than 3. For instance only one MPM is kept, corresponding to the mode from the left CU, or to the mode from the right CU, to the mode from the collocated BL CU.

The change can be normative: since only N remaining modes are possible, the remaining mode can be coded using fewer bits than 5. If $N=2^K$, K bits are required to code the remaining mode. This saves useless bits and therefore has positive impacts on the bit cost of the intra mode coding.

The change can be non-normative: even if only N remaining modes are possible, the remaining mode is still coded using 5 bits. This modification reduces the complexity of the encoding process, with a slight coding efficiency loss.

In both cases, the encoder has just to check a maximum number of N+3 modes, instead of the 35 usual HEVC intra modes. If the number of MPMs is reduced to a value NO, only N+NO modes have to be checked.

In an algorithm according to one embodiment of the invention, the remaining modes are constrained to be in a pre-defined set of modes.

In an embodiment, it is ensured that the set of N remaining modes does not contain the MPMs. Consequently the set of potential remaining modes is equal to N+3 (3 being the number of MPMs), and the first N modes from this set, different from the 3 MPMs, are considered as possible remaining modes.

For instance, for N=8, the following 11 potential remaining modes are considered:

{0, 1, 10, 26, 18, 34, 2, 22, 14, 30, 6}

Corresponding to

{Planar, DC, Horizontal, Vertical, Diagonal Top-Left, Diagonal Top-Right, Diagonal Bottom-Left, then 4 modes close to Horizontal and Vertical modes}

In a preferred embodiment, the number of MPMs is set to 3, and the number of remaining modes is set to 4. The total number of possible modes is 7.

In another embodiment, the number of MPMs is set to 3, and the number of remaining modes is set to 2. The total number of possible modes is 5.

In another embodiment, when the N is at maximum equal to 4, the pre-defined set is defined as follows:

{26, 10, 18, 34, 2, 22, 14} the indexes respectively corresponding to {Horizontal, Vertical, Diagonal Top-Left, Diagonal Top-Right, Diagonal Bottom-Left, then 2 modes close to Horizontal and Vertical modes}.

In another embodiment, if more than four modes are used (N>4), the pre-defined set is specified as the sub-set of the first N+NO modes from the following set:

{26, 10, 18, 34, 2, 22, 14, 30, 6, 24, 12, 28, 8, 20, 16, 32, 4, 17, 19}

The three (or more generally NO) MPMs values are removed from this predefined set. The final set is the set of the N first modes still present in the predefined set.

One particular embodiment of an algorithm for providing the second set of remaining modes is described with reference to FIG. 10F. A first set of pre-defined modes is specified in step 1001F. Step 1002F involves removing the MPMs values from this set, to obtain the final set of N remaining modes.

In an algorithm according to another embodiment of the invention, the remaining modes for providing a second set of remaining prediction modes in addition to a first set of MPMs are defined based on one or several values among the MPMs and the BL mode value from the co-located BL CU (when it is different from the MPMs). A first condition checking is performed based on the MPMs or the BL co-located CU mode (when it is different from the MPMs). If the conditions are not true, a first algorithm, not dependent on the BL mode value nor on the MPMs (for instance the Remaining Modes Algorithm 1) is applied to derive an initial set of potential remaining modes for the second set. If the conditions are true, the initial set of potential remaining modes is defined from the BL mode value or from one or several of the MPMs. Then the MPMs values and BL mode value (when it is different from the MPMs) are removed from the initial set to generate the final set of N remaining modes.

According to another embodiment of the invention as represented in FIG. 10A (non-normative change), the set of remaining modes forming a second set of remaining prediction modes in addition to the first set of MPMs, is derived as follows:

If the BL mode is not intra (check in step 1010A), the normal process applies with all the possible intra modes in the set of remaining modes minus the MPMs (in practice, 35 modes minus 3 are possible) (step 1012A).

Otherwise if the BL mode is intra, the following process applies:

the BL mode is inserted into the set of remaining modes if it is not equal to any of the MPMs (step 1011A).

If the BL mode is angular (check in step 1013A), the set of remaining modes is completed by the neighboring modes closest to the BL mode and which are not equal to any of the MPMs, until the number of modes in the set reaches N (step 1014A).

Otherwise if MPM0 is angular (check in step 1015A), the set of remaining modes is completed by the neighboring modes closest to the MPM0 and which are not equal to any of the MPMs, until the number of modes in the set reaches N (step 1016A).

Otherwise (BL mode and MPM0 are not angular), the set of remaining modes corresponds to the N first neighboring modes which are not equal to any of the MPMs from the pre-defined set (step 1017A).

In an embodiment, the neighboring modes of a mode m are computed as follows:

Lower mode: 2+((m+29)% 32)
Higher mode: 2+((m−2+1)% 32)

According to yet another embodiment of the invention as represented in FIG. 10B (normative change), the set of remaining modes, forming a second set of remaining prediction modes in addition to the first set of MPMs, is derived as follows:

If the BL mode is not intra (check in step 1010B), the set of remaining modes corresponds to the N first neighboring modes which are not equal to any of the MPMs from the pre-defined set (step 1018B).

In an embodiment, a second pre-defined set, different from the pre-defined set, is used in this step.

Otherwise (BL mode is intra), the following process applies:

the BL mode is inserted into the set of remaining modes if it is not equal to any of the MPMs (step 1011B).

If the BL mode is angular (check in step 1013B), the set of remaining modes is completed by the N neighboring modes closest to the BL mode and which are not equal to any of the MPMs (check 1014B).

Otherwise if MPM0 is angular (check in step 1015B), the set of remaining modes is completed by the N neighboring modes closest to the MPM0 and which are not equal to any of the MPMs (step 1016B).

Otherwise (BL mode and MPM0 are not angular), the set of remaining modes corresponds to the N first neighboring modes which are not equal to any of the MPMs from the pre-defined set (step 1017B).

According to another embodiment of the invention as represented in FIG. 10C, the set of remaining modes is derived as follows:

a parameter colBaseDir is initialized to −1 (step 1020C), the intra modes being numbered from 0 to M−1; the value −1 therefore enables to identify a non-intra mode.

If the BL mode is intra (check in step 1021C), the parameter colBaseDir is set equal to the BL Mode (step 1022C).

If colBaseDir is intra and is an angular mode (in practice, the test corresponds to: "is colBaseDir larger than 1?") (check in step 1023C), the mode colBaseDir is inserted into the set of remaining modes if it is not equal to any of the MPMs (step 1024C).

A reference mode RefMode is derived as follows:

If colBaseDir is intra and is an angular mode (in practice, the test corresponds to: "is colBaseDir larger than 1?") (check in step 1025C), RefMode is set equal to colBaseDir (step 1026C)

Otherwise RefMode is set equal to one of the MPMs (preferably to MPM0) (step 1027C)

If RefMode is angular (in practice, the test corresponds to: "is RefMode larger than 1?") (check in step 1028C), the set of remaining modes is completed by the N neighboring modes closest to RefMode and which are not equal to any of the MPMs (step 1029C).

Otherwise (RefMode is not angular), the set of remaining modes corresponds to the N first neighboring modes which are not equal to any of the MPMs from the pre-defined set (step 1030C).

In these different algorithms, the modes are added to the set of remaining modes when they are not equal to any one of the MPMs. Practically, this can be done using the following process illustrated in FIG. 10E:

A table of flags checkedModes[k] is initialized to 0, for k=0 . . . M−1, M being the total number of modes (35 in HEVC) (step 1031E)

For the three MPMs, noted MPMi, i=0 . . . N0 (where N0=2 in HEVC), checkedModes[MPMi] is set to 1 (step 1032E).

The candidate modes are added to the set of remaining modes until this set reaches N modes, according to the following process:

Let m be the next candidate mode (step 1033E)
if checkedModes[m] is equal to 0 (check 1034E).
m is inserted in the set of remaining modes (step 1035E)
the number of modes of the set is incremented by one and checkedModes[m] is set equal to 1 (step 1036E)
If the number of modes in the set of remaining modes is lower than N (check 1037E), return to step a 1033E.
Otherwise the process is ended (1038E)
Otherwise return to step 1033E.

When the change is normative, the remaining mode, used in the HEVC specification to signal the value of the remaining mode and represented by a variable 'rem_intra_luma_pred_mode', is coded using less bits. At the decoder side, once the syntax element rem_intra_luma_pred_mode has been decoded, the actual intra prediction mode is defined as rem[rem_intra_luma_pred_mode], where rem[x] is the xth element of the set of remaining modes.

This is illustrated in FIG. 10F. In step 1003F, conditions related to the BL mode or MPMs values are checked. If it is false, step 1004F generates the 1st set of potential remaining modes independently from the BL mode and MPMs values. If the condition is true, step 1005F generates the 1st set of potential remaining modes based on the BL mode value or from one or several of the MPMs. Step 1006 comprises removing the MPMs values from this 1st set, to obtain the final set of remaining modes.

For example in one particular embodiment, the conditions checked in step 1003F is:
Is the co-located BL CU intra coded?

In another embodiment, the conditions checked in step 1003F are:
Is the co-located BL CU intra coded?
and
Is the co-located BL intra mode an angular mode (mode >1)?

In another embodiment, the conditions checked in step 1003F are:
Is the MPM0 an angular mode (mode >1)?

In another embodiment, the conditions checked in step 1003F are:
Is the co-located BL CU intra coded and Is the co-located BL intra mode an angular mode (mode >1)?
If not, Is the MPM0 an angular mode (mode >1)?

In another embodiment, the conditions checked in step 1003F are:
Is the MPM0 an angular mode (mode >1)?
If not, Is the co-located BL CU intra coded and Is the co-located BL intra mode an angular mode (mode >1)?

In another embodiment, the conditions checked in step 1003F are:
Is the co-located BL CU intra coded and Is the co-located BL intra mode an angular mode (mode >1)?
If not, Is one of the MPMs an angular mode (mode >1)?

In another embodiment, the conditions checked in step 1003F are:
Is one of the MPMs an angular mode (mode >1)?
If not, Is the co-located BL CU intra coded and Is the co-located BL intra mode an angular mode (mode >1)?

In another embodiment, the set of potential remaining modes is dependent on the BL mode and corresponds to the neighbouring angular modes to the BL mode, in the following order:
Remaining modes 0 and 1: BL mode + and −1 (or −1 and +1)
Remaining modes 2 and 3: BL mode + and −2 (or −2 and +2)
Remaining modes 4 and 5: BL mode + and −3 (or −3 and +3)

In an embodiment, the set of potential remaining modes is dependent on the MPM0, and corresponds to the neighbouring angular modes to the MPM0, in the following order:
Remaining modes 0 and 1: MPM0+ and −1 (or −1 and +1)
Remaining modes 2 and 3: MPM0+ and −2 (or −2 and +2)
Remaining modes 4 and 5: MPM0+ and −3 (or −3 and +3)
and so order until the number of authorized remaining modes is reached In an embodiment, a reference mode refMode is computed as one mode among the MPMs and BL modes. The set of potential remaining modes is dependent on the reference mode refMode and corresponds to the neighbouring angular modes to the refMode, in the following order:
Remaining modes 0 and 1: refMode + and −1 (or −1 and +1)
Remaining modes 2 and 3: refMode + and −2 (or −2 and +2)
Remaining modes 4 and 5: refMode + and −3 (or −3 and +3) and so order until the number of authorized remaining modes is reached.

In another embodiment, refMode is computed as follows:
If the co-located BL CU is intra coded, refMode is set equal to the BL mode
Otherwise refMode is set equal to MPM0

In another embodiment, refMode is computed as follows:
If the co-located BL CU is intra coded and the BL mode is angular, refMode is set equal to the BL mode
Otherwise refMode is set equal to MPM0

In another embodiment, refMode is computed as follows:
If the co-located BL CU is intra coded and the BL mode is angular, refMode is set equal to the BL mode
Otherwise if MPM0 is angular, refMode is set equal to MPM0
Otherwise if MPM1 is angular, refMode is set equal to MPM1
Otherwise if MPM2 is angular, refMode is set equal to MPM2

An additional operator is applied to avoid that the remaining mode values are below 0 or above 34.

In an algorithm according to a further embodiment of the invention, the remaining modes are defined to a limited set of modes around the BL mode. If the BL co-located block is not intra coded, the BL mode is enforced to a given pre-defined value, for instance DC mode.

For instance the following 4 remaining modes are used:
BL mode +1
BL mode +2
BL mode −1
BL mode −2

An additional operator is applied to avoid that the remaining mode values are below 0 or above 34.

In the reference software used in the HEVC group, a specific intra coding mode selection applies at the encoder. In this process, the number of modes M is 35. If the 35 modes are evaluated using a full rate-distortion evaluation, that performs the full coding and decoding process for each mode, the resulting complexity would be very significant. The actual process used in the reference software aims at limiting the complexity, by applying a 2-step approach, the first step enabling a fast selection among the 35 possible modes of some best candidates, the second step consisting in checking these best candidates by the full rate-distortion evaluation.

As illustrated in FIG. 10D, a set of K1 modes is first selected by a first selection section FASTSEL among the M=35 possible modes. This first selection section FASTSEL allows reducing the number of modes to be performed in the Rate distortion optimization process (RDO).

Indeed the K1 modes selected by the first selection section FASTSEL are tested by a second selection section RDO and a best mode m_opt is selected from among the K1 modes.

The first selection section FASTSEL operates as follows. For each mode m<M, a prediction unit 1911 is able to predict the current Coding Unit according to the considered mode. M predicted current Coding Units are then delivered to the following units.

A distortion Dp(m) is evaluated by a distortion calculation unit 1912 on each received predicted Coding Unit. The distortion can be for instance the mean square error, the mean absolute difference, or the mean absolute of the Hadamard transform of the difference between the predicted Coding Unit and the original one. A coding cost Rp(m) of the mode (evaluated as R(m) (explained below) but without counting the cost of coding a prediction residual) is also evaluated by a coding cost calculation unit 1913, on each received predicted Coding Unit. An estimated rate-distortion cost Cp(m) is then evaluated by a rate-distortion cost calculation unit 1914 using Cp(m)=Dp(m)+λp.Rp(m), where λp is another pre-defined parameter possibly depending on the coding parameters (such as quantization parameter, picture or slice type, . . . ). K modes among the M possible modes are selected to form a candidates set by a selection unit 1915. Those K modes are the modes associated to the K smallest values Cp(m) evaluated by the rate-distortion cost calculation unit 1914. They are delivered to the selection unit 1915 after being sorted in increasing order of coding cost Cp(m).

K is a pre-defined number with K<M (in a preferred embodiment, K=8 for 4×4 and 8×8 Coding Units and K=3 for the other Coding Unit sizes).

Possibly, part or all of the MPMs can be added to this set of K modes if they are not yet present, leading to K1 candidate modes.

According to an embodiment, the encoder process is slightly modified as follows. If the maximum number of available modes N+N0 is lower than or equal to K, the fast search FASTSEL is not required and the full RDO search can directly apply to the N+N0 available modes. This means that K1 is set to N+N0. This saves computation and therefore further simplifies the encoding process. This is illustrated in FIG. 10G. The step 1917 performs the derivation of the set of N+N0 remaining modes according to the invention. Step 1918 then checks if the number of modes N+N0 is lower than or equal to K1. If this condition is false, then the normal process applies with the FASTSEL then RDO processes. If this condition is true, then the number of candidates modes K1 is set to N+N0 (step 1919) and the RDO process directly applies.

In a further embodiment of the invention, as illustrated in FIG. 11, a modified MPM process is proposed that takes into account the co-located BL mode of the EL CU. First a condition is checked related to the BL mode in step 1101. If this condition is false, the normal MPM process, for instance as defined in the non-scalable HEVC specification, applies in step 1102. Otherwise the MPM is derived based on the BL mode value in step 1103.

In an embodiment, the condition checked in step 1101 is:
Is the co-located BL CU intra coded?
In an embodiment, the condition checked in step 1101 is:
Is the co-located BL CU intra coded?
and
Is the co-located BL intra mode an angular mode (mode >1)?

In an embodiment, if the condition is true, the MPM derivation process based on the BL mode (corresponding to step 1103) works as illustrated in FIG. 12. As in the usual HEVC MPM derivation, the input of the MPM derivation is two candidates modes candA and candB derived from the EL top and left CUs. Then the following applies. The first MPM is set to the BL mode in step 1201.

If in step 1202, the checking that BL mode is equal to candA is false, then MPM1 is set to candA in step 1205. Then step 1206 checks if BL mode is equal to candB or if candA is equal to candB. If this is false, MPM2 is set to candB in step 1207. If this is true, step 1209 applies, which derives MPM2 to a value different from MPM0 and MPM1.

If in step 1202, the checking that BL mode is equal to candA is true, then step 1203 checks if BL mode is equal to candB. If this is true, then MPM1 and MPM2 are set to two other values than MPM0, preferably two neighbouring values of the MPM0 value. Otherwise, MPM1 is set to candB in step 1208. Then step 1209 applies, which derives MPM2 to value different from MPM0 and MPM1.

In an embodiment, step 1204 consists in setting MPM1 to a lower value than MPM0, and MPM2 to a larger value than MPM0 (or inversely).

In an embodiment, step 1209 consists in comparing MPM0 and MPM1. If MPM1 is greater than MPM0, then MPM2 is set to a lower value than MPM0. Otherwise MPM2 is set to a larger value than MPM0.

In steps 1204 and 1209, an additional operator is possibly applied to MPM1 and MPM2 to avoid that the MPM values are below 0 or above 34.

In an embodiment, the decoding tree for the intra mode coding, depicted in FIG. 13, is as follows. A first flag (1301) indicates if the mode is equal to MPM0 or not. Depending on this flag, the mode is set to MPM0 (1302) or a second flag is used to indicate if the mode is equal to MPM1 or not (1303). Depending on this flag, the mode is set to MPM1 (1304) or a third flag is used to indicate if the mode is equal to MPM2 or not (1305). Depending on this flag, the mode is set to MPM2 (1306) or the remaining mode is decoded (1307). The corresponding codewords are presented in Table 1:

TABLE 1

| mode | bits | Number of Bits |
| --- | --- | --- |
| MPM0 | 0 | 1 |
| MPM1 | 10 | 2 |
| MPM2 | 110 | 3 |
| Remaining mode | 111XXXXX | 8 |

In an embodiment, the decoding tree for the intra mode coding, depicted in FIG. 14, is as follows. A first flag (1401) indicates if the mode is equal to MPM0 or not. Depending on this flag, the mode is set to MPM0 (1402) or a second flag is used to indicate if the mode is equal to MPM1 or MPM2, or not (1403). Depending on this flag, the remaining mode is decoded (1405), or a third flag is used to indicate if the mode is MPM1 or MPM2 (1404). Depending on this flag, the mode is set to MPM1 (1406) or MPM2 (1407). The corresponding codewords are presented in Table 2:

TABLE 2

| mode | bits | Number of Bits |
| --- | --- | --- |
| MPM0 | 0 | 1 |
| MPM1 | 100 | 3 |
| MPM2 | 101 | 3 |
| Remaining mode | 11XXXXX | 7 |

In an embodiment, the decoding tree for the intra mode coding, depicted in FIG. 15, is as follows. A first flag (1501) indicates if the mode is equal to MPM0 or not. Depending on this flag, the mode is set to MPM0 (1502) or not. If not, a second flag is used to indicate if the mode is equal to MPM1 or MPM2, or not (1503). If condition 1503 is false, a third flag indicates if the mode is MPM1 or not (1504). Depending on this third flag, the mode is set to MPM1 (1506) or to MPM2 (1507). If condition 1503 is true, a fourth flag is used to indicate if the mode is close to the MPM0 value (+/−1 or +/−2), or not (test 1505). If condition 1505 is false, the remaining mode is decoded (1509). If condition 1505 is true, a fifth flag indicates the sign of the difference value (1508). Then, a sixth flag indicates if the difference is one or not (1510). If yes, the mode is set to MPM0+1 or MPM0−1 depending on the sign indicated in fifth flag (1511). If not, the mode is set to MPM0+2 or MPM0 −2 depending on the sign indicated in fifth flag (1512). The corresponding codewords are presented in Table 3:

TABLE 3

| mode | bits | Number of Bits |
|---|---|---|
| MPM0 | 0 | 1 |
| MPM1 | 100 | 3 |
| MPM2 | 101 | 3 |
| MPM0 + 1 | 11000 | 5 |
| MPM0 + 2 | 11001 | 5 |
| MPM0 − 1 | 11010 | 5 |
| MPM0 − 2 | 11011 | 5 |
| Rest | 111XXXXX | 8 |
| MPM0 | 0 | 1 |
| MPM1 | 100 | 3 |
| MPM2 | 101 | 3 |
| Remaining mode | 11XXXXX | 7 |

FIG. 16A illustrates a data communication system in which one or more embodiments of the invention may be implemented. The data communication system comprises a sending device, in this case a server 11, which is operable to transmit data packets of a data stream 14 to a receiving device, in this case a client terminal 12, via a data communication network 10. The data communication network 10 may be a Wide Area Network (WAN) or a Local Area Network (LAN). Such a network may be for example a wireless network (Wifi/802.11a or b or g or n), an Ethernet network, an Internet network or a mixed network composed of several different networks. In a particular embodiment of the invention the data communication system may be, for example, a digital television broadcast system in which the server 11 sends the same data content to multiple clients.

The data stream 14 provided by the server 11 may be composed of multimedia data representing video and audio data. Audio and video data streams may, in some embodiments, be captured by the server 11 using a microphone and a camera respectively. In some embodiments data streams may be stored on the server 11 or received by the server 11 from another data provider. The video and audio streams are coded by an encoder of the server 11 in particular for them to be compressed for transmission.

In order to obtain a better ratio of the quality of transmitted data to quantity of transmitted data, the compression of the video data may be of motion compensation type, for example in accordance with the HEVC type format or H.264/SVC type format.

A decoder of the client 12 decodes the reconstructed data stream received by the network 10. The reconstructed images may be displayed by a display device and received audio data may be reproduced by a loud speaker.

FIG. 16B schematically illustrates an example of a device 1600, in which one or more embodiments of the invention may be implemented. The exemplary device as illustrated is arranged in cooperation with a digital camera 1601, a microphone 1624 connected to a card input/output, a telecommunications network 1640 and a disk 1616. The device 1600 includes a communication bus 1602 to which are connected:

a central processing CPU 1603 provided, for example in the form of a microprocessor
 a read only memory (ROM) 1604 comprising a computer program 1604A whose execution enables methods according to one or more embodiments of the invention to be performed. This memory 1604 may be a flash memory or EEPROM, for example;
 a random access memory (RAM) 1606 which, after powering up of the device 1600, contains the executable code of the program necessary for the implementation of one or more embodiments of the invention. The memory 106, being of a random access type, provides more rapid access compared to ROM 1604. In addition the RAM 1606 may be operable to store images and blocks of pixels as processing of images of the video sequences is carried out on the video sequences (transform, quantization, storage of reference images etc.);
 a screen 1608 for displaying data, in particular video and/or serving as a graphical interface with the user, who may thus interact with the programs according to embodiments of the invention, using a keyboard 1610 or any other means e.g. a mouse (not shown) or pointing device (not shown);
 a hard disk 1612 or a storage memory, such as a memory of compact flash type, able to contain the programs of embodiments of the invention as well as data used or produced on implementation of the invention;
 an optional disc drive 1614, or another reader for a removable data carrier, adapted to receive a disc 1616 and to read/write thereon data processed, or to be processed, in accordance with embodiments of the invention and;
 a communication interface 1618 connected to a telecommunications network 1640
 connection to a digital camera 1601; It will be appreciated that in some embodiments of the invention the digital camera and the microphone may be integrated into the device 1600 itself. Provision of a digital camera and a microphone is optional.

The communication bus 1602 permits communication and interoperability between the different elements included in the device 1600 or connected to it. The representation of the communication bus 1602 given here is not limiting. In particular, the CPU 1603 may communicate instructions to any element of the device 1600 directly or by means of another element of the device 1600.

The disc 1616 can be replaced by any information carrier such as a compact disc (CD-ROM), either writable or rewritable, a ZIP disc, a memory card or a USB key. Generally, an information storage means, which can be read by a micro-computer or microprocessor, which may optionally be integrated in the device 1600 for processing a video sequence, is adapted to store one or more programs whose execution permits the implementation of the method according to the invention.

The executable code enabling a coding device to implement one or more embodiments of the invention may be stored in ROM 1604, on the hard disc 1612 or on a removable digital medium such as a disc 1616.

The CPU 1603 controls and directs the execution of the instructions or portions of software code of the program or programs of embodiments of the invention, the instructions or portions of software code being stored in one of the aforementioned storage means. On powering up of the device 1600, the program or programs stored in non-volatile memory, e.g. hard disc 1612 or ROM 1604, are transferred into the RAM 1606, which then contains the executable code of the program or programs of embodiments of the invention, as well as registers for storing the variables and parameters necessary for implementation of embodiments of the invention.

It may be noted that the device implementing one or more embodiments of the invention, or incorporating it, may be implemented in the form of a programmed apparatus. For example, such a device may then contain the code of the computer program or programs in a fixed form in an application specific integrated circuit (ASIC).

The exemplary device 1600 described here and, particularly, the CPU 1603, may implement all or part of the processing operations as described in what precedes.

Embodiments of the invention enable base layer data to be exploited, and therefore:
- coding and decoding complexity to be reduced, by reducing the size of possible modes combinations or limiting these modes for the EL processing,
- coding efficiency to be increased by avoiding to spend useless bitrate,
- access to be offered in a flexible way to the spatial random access functionality Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of providing a mode value representing a prediction mode of at least part of an image to be encoded or decoded wherein the image portion is part of an enhancement layer of image data, the image being composed of a plurality of processing blocks, each processing block being predictable by applying a prediction mode of a plurality of M available prediction modes, the method comprising:
   determining first data indicative of a first set of most probable prediction modes, the first set comprising N0 number of prediction modes from the plurality of M available prediction modes, for predicting the at least part of the image wherein the most probable prediction modes of the first set of prediction modes are determined based on prediction modes of processing blocks neighbouring the image portion to be encoded or decoded;
   determining, for the case where a most probable prediction mode is not used, second data representative of a second set of prediction modes of the plurality of M available prediction modes wherein the second set of prediction modes comprise a restricted number N of prediction modes of the M available prediction modes, the N prediction modes of the second set being constrained to be in a predefined subset of the M available prediction modes not including said N0 prediction modes corresponding to the most probable prediction modes, and wherein at least one prediction mode of the second set of prediction modes is determined based on prediction modes of at least one spatially corresponding processing block of a base layer of the image data; and
   using the determined first data or the determined second data to encode the said at least part of the image into a bitstream or to decode a bitstream into the said at least part of the image,
   wherein N is smaller than a difference between M and N0.

2. The method according to claim 1, wherein $N=2^k$, and $k<5$.

3. The method according to claim 2, wherein N=2.

4. The method according to claim 2, wherein N=4.

5. The method according to claim 1, wherein there are three most probable prediction modes in the first set of most probable prediction modes.

6. The method according to claim 1, wherein the second set of prediction modes excludes most probable prediction modes of the first set of prediction modes.

7. The method according to claim 1, wherein at least one prediction mode of the second set of prediction modes is determined based on the most probable prediction modes.

8. The method according to claim 1, wherein at least one prediction mode of the second set of prediction modes is determined based on prediction modes of at least one spatially corresponding processing block of a base layer of the image data in the case where the at least one spatially corresponding processing block is intra-coded.

9. The method according to claim 8, comprising including in the second set of prediction modes at least one prediction mode of the at least one spatially corresponding processing block of the base layer of the image data in the case where the at least one prediction mode is different from the most probable prediction modes of the first set of prediction modes.

10. The method according to claim 8, further comprising including in the second set of prediction modes the neighbouring prediction modes of the prediction mode of the at least one spatially corresponding processing block of the base layer in the case where the prediction mode of the base layer is angular.

11. The method according to claim 8, wherein in the case where the prediction mode of the spatially corresponding processing block of the base layer is not angular, neighbouring modes of at least one angular prediction mode of the first set of prediction modes are included in the second set of prediction modes.

12. The method according to claim 8, wherein in the case where the prediction mode of the spatially corresponding processing block of the base layer is not angular and a first prediction mode of the first set of prediction modes is not angular, one or more prediction modes from a predefined set are added to the second set of prediction modes.

13. The method according to claim 1, wherein in the case where the prediction mode of the spatially corresponding processing block of the base layer is not intra coded one or more prediction modes from a predefined set are added to the second set of prediction modes.

14. The method according to claim 1, comprising including in the second set of prediction modes at least one prediction mode of the at least one spatially corresponding processing block of the base layer of the image data in the case where the at least one prediction mode is intra coded, angular and different from the most probable prediction modes of the first set of prediction modes.

15. The method according to claim 14, further comprising deriving a reference prediction mode for the second set of prediction modes.

16. The method according to claim 15, wherein the reference prediction mode is made equal to the said at least one prediction mode of the at least one spatially corresponding processing block of the base layer in the case where the said at least one prediction mode is intra coded and angular.

17. The method according to claim 16, further comprising including in the second set of prediction modes, neighbouring prediction modes of the reference prediction mode.

18. The method according to claim 15, wherein the reference prediction mode is made equal to a prediction mode of the first set of prediction modes in the case where the said prediction mode of at least one spatially corresponding processing block of the base layer is not intra coded or not angular.

19. The method according to claim 15, wherein in the case where the derived reference prediction mode is not angular, prediction modes from a predefined set of prediction modes are included in the second set of prediction modes.

20. The method according to claim 1, wherein the at least one prediction mode of the second set of prediction modes is determined based on at least one prediction mode of the at least one spatially corresponding processing block of the base layer of the image data if the at least one spatially corresponding processing block has an angular prediction mode.

21. The method according to claim 1, wherein the at least one prediction mode of the second set of prediction modes is determined based on at least one prediction mode of the at least one spatially corresponding processing block of the base layer of the image data in the case where at least one of the most probable prediction modes has an angular prediction mode.

22. The method according to claim 1, wherein the at least one prediction mode of the second set of prediction modes is determined based on neighbouring angular modes of the angular mode of the at least one spatially corresponding processing block of the base layer of the image data.

23. The method according to claim 1, wherein at least one prediction mode of the second set of prediction modes is determined based on neighbouring angular modes of the angular mode of at least one of the most probable prediction modes.

24. The method according to claim 1, wherein a reference prediction mode is determined based on the most probable prediction modes and at least one prediction mode of the at least one spatially corresponding processing block of the base layer of the image data, wherein the at least one prediction mode of the second set of prediction modes is determined based on neighbouring angular modes of the reference prediction mode.

25. The method according to claim 1, wherein if the spatially corresponding processing block is not intra-coded the prediction mode of the spatially corresponding processing block is set to a predefined mode.

26. The method according to claim 1, wherein the most probable prediction modes of the first set of prediction modes are determined based on prediction modes of at least one spatially corresponding processing block of the base layer.

27. The method according to claim 1, wherein the most probable prediction modes are determined based on prediction modes of at least one spatially corresponding processing block of the base layer in the case where at least one predefined criterion is satisfied, otherwise the most probable prediction modes are determined based on prediction modes of processing blocks neighbouring the image portion to be encoded.

28. The method according to claim 27, wherein the at least one predefined criterion comprises whether or not the at least one spatially corresponding processing block of the base layer is intra coded.

29. The method according to claim 27, wherein the at least one predefined criterion comprises whether or not the at least one spatially corresponding processing block of the base layer has an angular prediction mode.

30. The method according to claim 1, wherein the most probable mode prediction modes are different from one another.

31. A device for providing a mode value representing a prediction mode of at least part of an image to be encoded or decoded wherein the image portion is part of an enhancement layer of image data, the image being composed of a plurality of processing blocks, each processing block being predictable by applying a prediction mode of a plurality of M available prediction modes, the device comprising:
a processor configured to:
determine first data indicative of a first set of most probable prediction modes, the first set comprising N0 number of prediction modes from the plurality of M available prediction modes, for predicting the at least part of the image, wherein the most probable prediction modes of the first set of prediction modes are determined based on prediction modes of processing blocks neighbouring the image portion to be encoded or decoded;
determine second data representative of a second set of prediction modes of the plurality of M available prediction modes wherein the second set of prediction modes comprise a restricted number N of prediction modes of the M available prediction modes, the N prediction modes of the second set being constrained to be in a predefined subset of the M available prediction modes not including said N0 prediction modes corresponding to the most probable prediction modes, and wherein at least one prediction mode of the second set of prediction modes is determined based on prediction modes of at least one spatially corresponding processing block of a base layer of the image data; and
use the determined first data or the determined second data to encode the said at least part of the image into a bitstream or to decode a bitstream into the said at least part of the image,
wherein N is smaller than a difference between M and N0.

32. The device according to claim 31, wherein $N=2^k$, and $k<5$.

33. The device according to claim 32, wherein N=2.

34. The device according to claim 32, wherein N=4.

35. The device according to claim 31, wherein there are three most probable prediction modes in the first set of most probable prediction modes.

36. The device according to claim 31, wherein the second set of prediction modes excludes most probable prediction modes of the first set of prediction modes.

37. The device according to claim 31, wherein the processor is configured to determine at least one prediction mode of the second set of remaining prediction modes based on the most probable prediction modes.

38. The device according to claim 31, wherein the image portion is part of an enhancement layer of image data and the processor is configured to determine at least one prediction mode of the second set of prediction modes based on prediction modes of at least one spatially corresponding processing block of a base layer of the image data in the case where the at least one spatially corresponding processing block is intra-coded.

39. The device according to claim 38, wherein the processor is configured to include at least one prediction mode of the at least one spatially corresponding processing block of the base layer of the image data in the second set of prediction modes in the case where the said at least one prediction mode is different from the most probable prediction modes of the first set of prediction modes.

40. The device according to claim 38, wherein the processor is configured to include the neighbouring prediction modes of the prediction mode of the at least one spatially corresponding processing block of the base layer in the second set of prediction modes in the case where the said prediction mode of the base layer is angular.

41. The device according to claim 38, wherein the processor is configured to, in the case where the said prediction mode of the spatially corresponding processing block of the base layer is not angular, include neighbouring modes of at least one angular prediction mode of the first set of prediction modes in the second set of prediction modes.

42. The device according to claim 38, wherein the processor is configured to in the case where the said prediction mode of the spatially corresponding processing block of the base layer is not angular and a first prediction mode of the first set of prediction modes is not angular, add one or more prediction modes from a predefined set to the second set of prediction modes.

43. The device according to claim 38, wherein the processor is configured to, in the case where the said prediction mode of the spatially corresponding processing block of the base layer is not intra coded, add one or more prediction modes from a predefined set to the second set of prediction modes.

44. The device according to claim 38, wherein the processor is configured to include at least one prediction mode of the at least one spatially corresponding processing block of the base layer of the image data in the second set of prediction modes in the case where the said at least one prediction mode is intra coded, angular and different from the most probable prediction modes of the first set of prediction modes.

45. The device according to claim 44, comprising the processor is configured to derive a reference prediction mode for determining the second set of prediction modes.

46. The device according to claim 45, wherein the processor is configured to make the reference prediction mode equal to the said at least one prediction mode of the at least one spatially corresponding processing block of the base layer in the case where the said at least one prediction mode is intra coded and angular.

47. The device according to claim 46, wherein the processor is configured to include neighbouring angular prediction modes of the reference prediction mode in the second set of prediction modes.

48. The device according to claim 45, wherein the processor is configured to make the reference prediction mode equal to a prediction mode of the first set of prediction modes in the case where the said prediction mode of at least one spatially corresponding processing block of the base layer is not intra coded and/or not angular.

49. The device according to claim 45, wherein the processor is configured to in the case where the derived reference prediction mode is not angular, include prediction modes from a predefined set of prediction modes in the second set of prediction modes.

50. The device according to claim 31, wherein the processor is configured to determine the at least one prediction mode of the second set of prediction modes based on at least one prediction mode of the at least one spatially corresponding processing block of the base layer of the image data if the at least one spatially corresponding processing block has an angular prediction mode.

51. The device according to claim 31, wherein the processor is configured to determine the at least one prediction mode of the second set of prediction modes based on at least one prediction mode of the at least one spatially corresponding processing block of the base layer of the image data in the case where the at least one of the most probable prediction modes has an angular prediction mode.

52. The device according to claim 31, wherein the processor is configured to determine the at least one prediction mode of the second set of prediction modes based on neighbouring angular modes of the angular mode of the at least one spatially corresponding processing block of the base layer of the image data.

53. The device according to claim 31, wherein the processor is configured to determine the at least one prediction mode of the second set of prediction modes based on neighbouring angular modes of the angular mode of at least one of the most probable prediction modes.

54. The device according to claim 31, wherein the processor is configured to determine a reference prediction mode based on the most probable prediction modes and at least one prediction mode of the at least one spatially corresponding processing block of the base layer of the image data and to determine the at least one prediction mode of the second set of prediction modes based on neighbouring angular modes of the reference prediction mode.

55. The device according to claim 31, wherein the processor is configured to, if the spatially corresponding processing block is not intra-coded, set the prediction mode of the spatially corresponding processing block to a predefined mode.

56. The device according to claim 31, wherein the processor is configured to determine the most probable prediction modes of the first set of prediction modes based on prediction modes of processing blocks neighbouring the image portion to be encoded.

57. The device according to claim 31, wherein the processor is configured to determine the most probable prediction modes of the first set of prediction modes based on prediction modes of at least one spatially corresponding processing block of the base layer.

58. The device according to claim 31, wherein the processor is configured to determine the most probable prediction modes based on prediction modes of at least one spatially corresponding processing block of the base layer in the case where at least one predefined criterion is satisfied, and otherwise to determine the most probable prediction modes based on prediction modes of processing blocks neighbouring the image portion to be encoded.

59. The device according to claim 58, wherein the at least one predefined criterion comprises whether or not the at least one spatially corresponding processing block of the base layer is intra coded.

60. The device according to claim 58, wherein the at least one predefined criterion comprises whether or not the at least one spatially corresponding processing block of the base layer has an angular prediction mode.

61. The device according to claim 31, wherein the most probable mode prediction modes are different from one another.

62. A non-transitory computer readable storage medium carrying processor executable instructions which when executed by one or more processors of a computer cause the computer to perform a method of providing a mode value representing a prediction mode of at least part of an image to be encoded or decoded wherein the image portion is part of an enhancement layer of image data, the image being composed of a plurality of processing blocks, each processing block being predictable by applying a prediction mode of a plurality of M available prediction modes, the method comprising:

determining first data indicative of a first set of most probable prediction modes, the first set comprising N0 number of prediction modes from the plurality of M available prediction modes, for predicting the said at least part of the image, wherein the most probable prediction modes of the first set of prediction modes are determined based on prediction modes of processing blocks neighbouring the image portion to be encoded or decoded;

determining, for the case where a most probable prediction mode is not used, second data representative of a second set of prediction modes of the plurality of M available prediction modes wherein the second set of prediction modes comprise a restricted number N of prediction modes of the M available prediction modes, the N prediction modes of the second set being constrained to be in a predefined subset of the M available prediction modes not including said N0 prediction modes corresponding to the most probable prediction modes, and at least one prediction mode of the second set of prediction modes is determined based on prediction modes of at least one spatially corresponding processing block of a base layer of the image data; and using the determined first data or the determined second data to encode the said at least part of the image into a bitstream or to decode a bitstream into the said at least part of the image, wherein N is smaller than a difference between M and N0.

63. A method of decoding at least part of an image from a bitstream, wherein the image portion is part of an enhancement layer of image data, the image being composed of a plurality of processing blocks, each processing block being predictable by applying a prediction mode of a plurality of M available prediction modes, the method comprising:

obtaining first indicator data from the bitstream, said first indicator data indicating whether a prediction mode of first data is to be used for decoding the at least part of the image, said first data indicative of a first set of most probable prediction modes, the first set comprising N0 number of prediction modes from the plurality of M available prediction modes, for predicting the said at least part of the image, wherein the most probable prediction modes of the first set of prediction modes are determined based on prediction modes of processing blocks neighboring the image portion to be decoded;

obtaining second indicator data from the bitstream, said second indicator data indicating a mode value representing a prediction mode for use in predicting the at least part of the image;

determining, based on the obtained first indicator data, whether a prediction mode of the first data is to be used for predicting the at least part of the image; and if a prediction mode of the first data is to be used for decoding the at least part of the image, obtaining the first data, and using the obtained first data and the obtained second indicator data to decode the said at least part of the image; or if a prediction mode of the first data is not to be used for decoding the at least part of the image, obtaining second data, said second data representative of a second set of prediction modes of the plurality of M available prediction modes wherein the second set of prediction modes comprise a restricted number N of prediction modes of the M available prediction modes, the N prediction modes of the second set being constrained to be in a predefined subset of the M available prediction modes, not including said N0 prediction modes corresponding to the most probable prediction modes, and at least one prediction mode of the second set of prediction modes is determined based on prediction modes of at least one spatially corresponding processing block of a base layer of the image data, and using the obtained second data and the obtained second indicator data to decode the said at least part of the image, wherein N is smaller than a difference between M and N0.

64. A device for decoding at least part of an image from a bitstream, wherein the image portion is part of an enhancement layer of image data, the image being composed of a plurality of processing blocks, each processing block being predictable by applying a prediction mode of a plurality of M available prediction modes, the device comprising a processor configured to:

obtain first indicator data from the bitstream, said first indicator data indicating whether a prediction mode of first data is to be used for decoding the at least part of the image, said first data indicative of a first set of most probable prediction modes, the first set comprising N0 number of prediction modes from the plurality of M available prediction modes, for predicting the said at least part of the image, wherein the most probable prediction modes of the first set of prediction modes are determined based on prediction modes of processing blocks neighboring the image portion to be decoded;

obtain second indicator data from the bitstream, said second indicator data indicating a mode value representing a prediction mode for use in predicting the at least part of the image;

determine, based on the obtained first indicator data, whether a prediction mode of the first data is to be used for predicting the at least part of the image; and if a prediction mode of the first data is to be used for decoding the at least part of the image, obtain the first data, and use the obtained first data and the obtained second indicator data to decode the said at least part of the image; or if a prediction mode of the first data is not to be used for decoding the at least part of the image, obtain second data, said second data representative of a second set of prediction modes of the plurality of M available prediction modes wherein the second set of prediction modes comprise a restricted number N of prediction modes of the M available prediction modes, the N prediction modes of the second set being constrained to be in a predefined subset of the M available prediction modes not including said N0 prediction modes corresponding to the most probable prediction modes, and at least one prediction mode of the second set of prediction modes is determined based on prediction modes of at least one spatially corresponding processing block of a base layer of the image data, and use the obtained second data and the obtained second indicator data to decode the said at least part of the image, wherein N is smaller than a difference between M and N0.

65. A non-transitory computer readable storage medium carrying processor executable instructions which when executed by one or more processors of a computer cause the computer to perform a method of decoding at least part of an image from a bitstream, wherein the image portion is part of an enhancement layer of image data, the image being composed of a plurality of processing blocks, each processing block being predictable by applying a prediction mode of a plurality of M available prediction modes, the method comprising:

obtaining first indicator data from the bitstream, said first indicator data indicating whether a prediction mode of first data is to be used for decoding the at least part of the image, said first data indicative of a first set of most probable prediction modes, the first set comprising N0 number of prediction modes from the plurality of M available prediction modes, for predicting the said at least part of the image, wherein the most probable prediction modes of the first set of prediction modes are determined based on prediction modes of processing blocks neighboring the image portion to be decoded;

obtaining second indicator data from the bitstream, said second indicator data indicating a mode value representing a prediction mode for use in predicting the at least part of the image;

determining, based on the obtained first indicator data, whether a prediction mode of the first data is to be used for predicting the at least part of the image; and if a prediction mode of the first data is to be used for decoding the at least part of the image, obtaining the first data, and using the obtained first data and the obtained second indicator data to decode the said at least part of the image; or if a prediction mode of the first data is not to be used for decoding the at least part of the image, obtaining second data, said second data representative of a second set of prediction modes of the plurality of M available prediction modes wherein the second set of prediction modes comprise a restricted number N of prediction modes of the M available prediction modes, the N prediction modes of the second set being constrained to be in a predefined subset of the M available prediction modes not including said N0 prediction modes corresponding to the most probable prediction modes, and at least one prediction mode of the second set of prediction modes is determined based on prediction modes of at least one spatially corresponding processing block of a base layer of the image data, and using the obtained second data and the obtained second indicator data to decode the said at least part of the image, wherein N is smaller than a difference between M and N0.

* * * * *